United States Patent
Adachi

(10) Patent No.: US 11,803,075 B2
(45) Date of Patent: Oct. 31, 2023

(54) DETECTING DEVICE AND DISPLAY DEVICE

(71) Applicant: Japan Display Inc., Tokyo (JP)

(72) Inventor: Koichiro Adachi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/824,399

(22) Filed: May 25, 2022

(65) Prior Publication Data
US 2022/0283459 A1    Sep. 8, 2022

Related U.S. Application Data

(63) Continuation of application No. PCT/JP2020/044041, filed on Nov. 26, 2020.

(30) Foreign Application Priority Data

Nov. 29, 2019   (JP) .................................. 2019-217568

(51) Int. Cl.
| | | |
|---|---|---|
| *G02F 1/1333* | (2006.01) | |
| *G06F 3/044* | (2006.01) | |
| *G02F 1/1335* | (2006.01) | |
| *G06F 3/041* | (2006.01) | |

(52) U.S. Cl.
CPC .... *G02F 1/13338* (2013.01); *G02F 1/133514* (2013.01); *G06F 3/0412* (2013.01); *G06F 3/0446* (2019.05)

(58) Field of Classification Search
CPC .... G06F 3/0448; G06F 3/0446; G06F 3/0412; G02F 1/13338; G02F 1/133514; G02F 1/134345; G02F 1/13439; G09F 9/30
See application file for complete search history.

(56) References Cited

U.S. PATENT DOCUMENTS

| | | | |
|---|---|---|---|
| 2014/0246225 A1 | 9/2014 | Mizuno et al. | |
| 2015/0042909 A1* | 2/2015 | Sekiguchi | G06F 3/0443 |
| | | | 349/12 |
| 2016/0291759 A1 | 10/2016 | Kurasawa et al. | |
| 2017/0003788 A1 | 1/2017 | Sekiguchi | |
| 2017/0308211 A1* | 10/2017 | Adachi | G02F 1/134309 |
| 2017/0315647 A1 | 11/2017 | Sekiguchi | |
| 2019/0196283 A1* | 6/2019 | Yoshida | G02F 1/134336 |

(Continued)

FOREIGN PATENT DOCUMENTS

| | | |
|---|---|---|
| JP | 2013-105099 A | 5/2013 |
| JP | 2013-152579 A | 8/2013 |

(Continued)

OTHER PUBLICATIONS

International Search Report issued in International Patent Application No. PCT/JP2020/044041 dated Feb. 16, 2021 and English translation of same. 6 pages.

(Continued)

*Primary Examiner* — Amit Chatly
(74) *Attorney, Agent, or Firm* — K&L Gates LLP

(57) ABSTRACT

A detecting device includes a plurality of detection electrodes extending in a first direction along a substrate and disposed apart from each other in a second direction orthogonal to the first direction, and a plurality of dummy electrodes provided between the detection electrodes. The detection electrodes each have a plurality of openings.

11 Claims, 18 Drawing Sheets

(56) References Cited

U.S. PATENT DOCUMENTS

| | | | |
|---|---|---|---|
| 2021/0165532 A1* | 6/2021 | Zhang | G06F 3/0446 |
| 2022/0283459 A1* | 9/2022 | Adachi | G09F 9/30 |
| 2022/0291785 A1* | 9/2022 | Adachi | G02F 1/13439 |

FOREIGN PATENT DOCUMENTS

| | | |
|---|---|---|
| JP | 2015-035122 A | 2/2015 |
| JP | 2016-197293 A | 11/2016 |
| JP | 2017-198729 A | 11/2017 |
| JP | 2018-049557 A | 3/2018 |
| KR | 10-2019-0108870 A | 9/2019 |
| TW | 201814365 A | 4/2018 |

OTHER PUBLICATIONS

Written Opinion issued in International Patent Application No. PCT/JP2020/044041 dated Feb. 16, 2021. 4 pages.

* cited by examiner

DETECTING DEVICE AND DISPLAY DEVICE

CROSS-REFERENCE TO RELATED APPLICATION

This application is a continuation of International Patent Application No. PCT/JP2020/044041 filed on Nov. 26, 2020 which designates the United States, incorporated herein by reference, which claims the benefit of priority from Japanese Patent Application No. 2019-217568 filed on Nov. 29, 2019, incorporated herein by reference.

BACKGROUND

1. Technical Field

The present disclosure relates to a detecting device and a display device.

2. Description of the Related Art

Detecting devices, what are called touch panels, that detect contact or proximity (hereinafter, contact and proximity are collectively referred to as touch) of an external object have recently been attracting attention. Touch panels are mounted on or integrated with the upper surface of a display device, such as a liquid crystal display device, and are used as display devices. The display device described in Japanese Patent Application Laid-open Publication No. 2015-035122 (JP-A-2015-035122) includes drive electrodes and detection electrodes intersecting the drive electrodes. Capacitance is formed at the intersections of the drive electrodes and the detection electrodes. When an external object touches the intersection, the amount of electric charge accumulated in the capacitance of the intersection changes. The display device detects a change in the amount of electric charge at the intersection and determines whether an external object touches the display device.

The display device includes a plurality of detection electrodes. The detection electrodes are disposed apart from each other in the extending direction of the drive electrodes. The space between the detection electrodes is a non-detection region that does not detect a touch of an external object. The detection electrodes of the display device described in JP-A-2015-035122 have a plurality of openings. The non-detection region is provided with a plurality of dummy electrodes formed into a circular shape. The openings of the detection electrodes and the dummy electrodes are formed by pattern processing and are regularly arrayed. As a result, the mesh shape formed by the drive electrodes and the detection electrodes is hard to visually recognize.

The end of the detection electrode serves as a boundary with the non-detection region. The end of the detection electrode described in JP-A-2015-035122 has a plurality of semicircular parts cut off in a semicircular shape and linear parts connecting the ends of the semicircular parts. The semicircular parts and the linear parts are alternately and continuously formed at the end of the detection electrode. When light is incident on the end of the detection electrode, linear light reflected by the linear part may possibly be visually recognized depending on the angle of the incident light.

An object of the present disclosure is to provide a detecting device and a display device that make linear reflected light hard to visually recognize.

SUMMARY

A detecting device according to an embodiment of the present disclosure includes a plurality of detection electrodes extending in a first direction along a substrate and disposed apart from each other in a second direction orthogonal to the first direction, and a plurality of dummy electrodes provided between the detection electrodes. The detection electrodes each have a plurality of openings, a plurality of arrays are formed in which the dummy electrodes and the openings of the detection electrodes are periodically arrayed in the second direction, the arrays include a first array and a second array adjacent to the first array in the first direction, the first array and the second array being alternately arrayed, each of the openings of the detection electrode belonging to the first array is formed in a triangular grid with two of the openings of the detection electrode belonging to the second array or with one of the openings of the detection electrode and one of the dummy electrodes belonging to the second array, each of the dummy electrodes belonging to the first array is disposed in a triangular grid with two of the dummy electrodes belonging to the second array or with one of the dummy electrodes and one of the openings of the detection electrode belonging to the second array, and an end of the detection electrode in the second direction has a plurality of recesses each formed into a circular arc shape along a first virtual circle and recessed toward inside of the detection electrode, and a plurality of protrusions each formed into a circular arc shape along a second virtual circle and protruding toward outside of the detection electrode, the recesses and the protrusions being alternately and continuously formed in the first direction.

A display device according to an embodiment of the present disclosure includes the detecting device above, a display substrate, and a color filter provided on a display surface of the display substrate. The color filter includes a first color filter provided in a first sub-pixel region, a second color filter provided in a second sub-pixel region, and a third color filter provided in a third sub-pixel region, the first color filter, the second color filter, and the third color filter being arrayed in order from one side to the other in the second direction, and the first color filter, the second color filter, and the third color filter are each disposed with the color filter in the same color being adjacent thereto in the first direction.

A detecting device according to an embodiment of the present disclosure includes a plurality of electrodes having a plane parallel to a substrate. The electrodes each have a rectangular shape surrounded by a plurality of ends, each of the ends of the electrodes has a protrusion having a circular arc shape protruding from inside toward outside of the plane, and a recess having a circular arc shape recessed from outside toward inside of the plane, and the protrusion and the recess are formed alternately and continuously along each of the ends of the electrodes.

DETAILED DESCRIPTION

Figure 1:
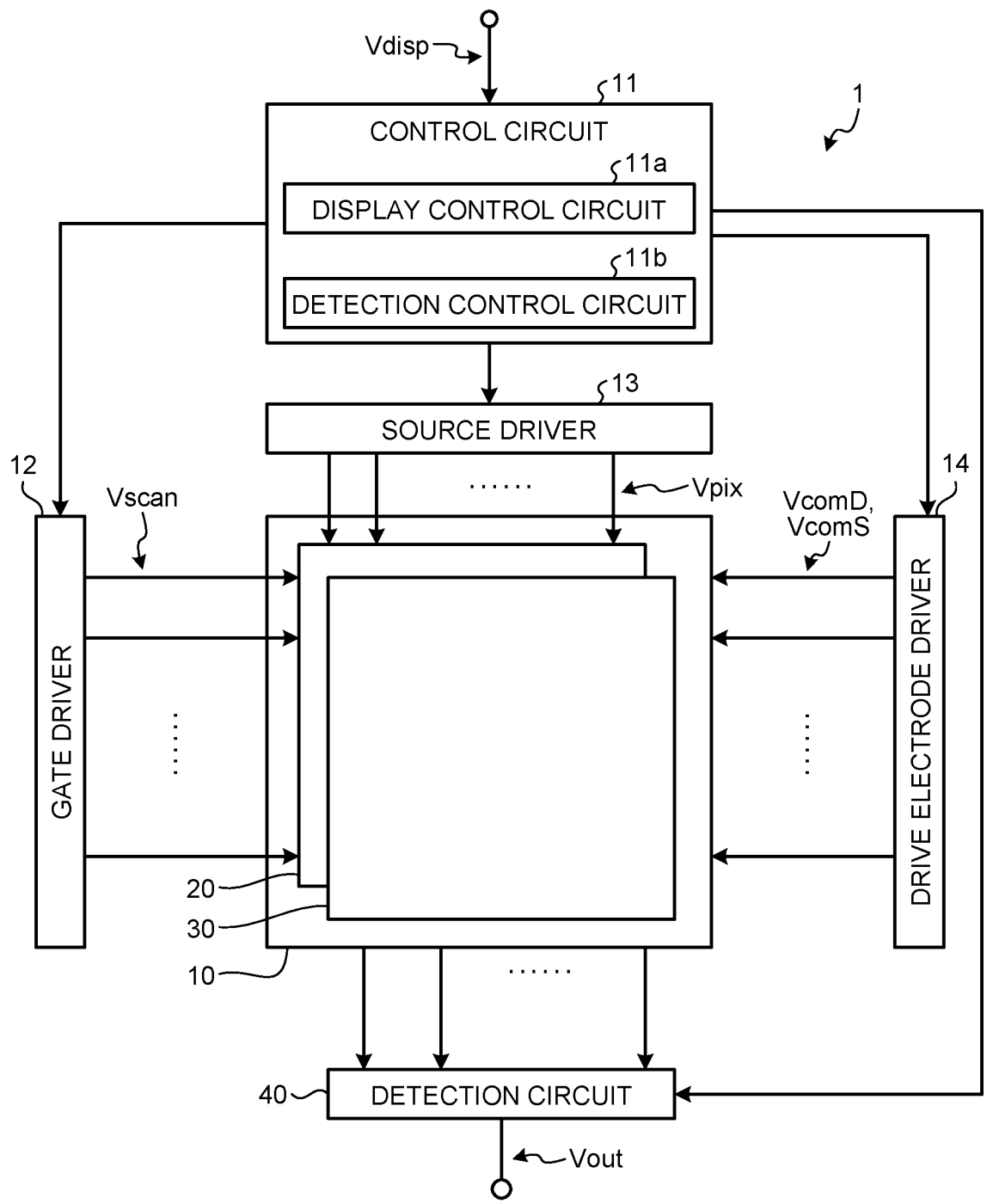
FIG. 1 is a block diagram of an example of the configuration of a display device according to a first embodiment.

Exemplary aspects (embodiments) to embody a detecting device according to the present disclosure are described below in greater detail with reference to the accompanying drawings. The contents described in the embodiments below are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the present disclosure and easily conceivable by those skilled in the art naturally fall within the scope of the present disclosure. To make the explanation more specific, the drawings may possibly illustrate the width, the thickness, the shape, and other elements of each component more schematically than the actual aspect. These elements, however, are given by way of example only and are not intended to limit interpretation of the present disclosure. In the present specification and the figures, components similar to those previously described with reference to previous figures are denoted by like reference numerals, and detailed explanation thereof may be appropriately omitted.

First Embodiment

FIG. 1 is a block diagram of an example of the configuration of a display device according to a first embodiment. As illustrated in FIG. 1, a display device 1 includes a display portion 20, a detector 30, a control circuit 11, a gate driver 12, a source driver 13, a drive electrode driver 14, and a detection circuit 40. The display portion 20 and the detector 30 constitute a panel portion 10. The panel portion 10 according to the present embodiment is what is called an in-cell detection panel that uses at least part of an electrode layer (drive electrodes Tx) constituting the display portion 20 also as an electrode layer (drive electrodes) constituting the detector 30. The panel portion 10 may be what is called an on-cell detection panel in which the detector 30 is provided on a substrate and an organic film, such as a sealing film, constituting the display portion 20.

The control circuit 11 is a circuit that supplies control signals to the gate driver 12, the source driver 13, the drive electrode driver 14, and the detection circuit 40 based on video signals Vdisp supplied from the outside to control their operations. The control circuit 11 includes a display control circuit 11a and a detection control circuit 11b, for example. The display control circuit 11a controls the gate driver 12, the source driver 13, and the drive electrode driver 14. The detection control circuit 11b controls the drive electrode driver 14 and the detection circuit 40. In other words, the control circuit 11 performs a display operation by the display portion 20 and a detection operation by the detector 30 in a time-division manner based on the control signals. The gate driver 12 is a circuit that selects display elements (sub-pixels SPix) of the display portion 20 to be driven for display based on the control signals supplied from the control circuit 11. More specifically, the gate driver 12 is a circuit that sequentially selects a scanning line GCL (one horizontal line) coupled to a plurality of display elements and supplies scanning signals Vscan to the selected scanning line GCL. The source driver 13 is a circuit that supplies pixel signals Vpix to the display elements (sub-pixels SPix) of the display portion 20 based on the control signals supplied from the control circuit 11. The drive electrode driver 14 is a circuit that supplies drive signals Vcom to the drive electrodes Tx (refer to FIG. 2) included in the display portion 20 and the detector 30 based on the control signals supplied from the control circuit 11. More specifically, the drive electrode driver 14 supplies display drive signals VcomD to the drive electrodes Tx constituting the display portion 20 and supplies detection drive signals VcomS to the drive electrodes Tx constituting the detector 30.

The display portion 20 is a display panel including display elements that display an image, for example. The display portion 20 according to the present embodiment is a liquid crystal display panel including liquid crystal elements LC as the display elements. The display portion 20 is a display panel that displays an image when the display elements selected by the gate driver 12 are supplied with the pixel signals Vpix from the source driver 13. The display portion 20 is not limited thereto and may be a light-emitting display panel including light-emitting elements, such as organic or inorganic light-emitting elements, as the display elements or an electrophoretic display panel including electrophoretic elements as the display elements, for example.

The detector 30 is a detection panel including detection elements that detect a touch. The detector 30 detects contact or proximity of an external conductor. The detector 30 is a capacitive detection panel that outputs detection signals indicating a change in capacitance due to contact or proximity of an external conductor, for example. The detection circuit 40 is a circuit that outputs output signals Vout based on the control signals supplied from the control circuit 11 and the detection signals supplied from the detector 30. More specifically, the detection circuit 40 includes an amplification circuit and an A/D conversion circuit. The amplification circuit amplifies the detection signals output from the detection elements (detection electrodes Rx). The A/D conversion circuit converts analog signals into digital signals. The detection circuit 40 also includes a signal processing circuit, such as a noise removing circuit like a band-pass filter, and a coordinate extraction circuit that derives coordinates at which a touch input is performed, for example. The detection circuit 40 may output the detection signals received from the detection elements (detection electrodes Rx) as the output signals Vout without any change. Alternatively, the detection circuit 40 may output the signals resulting from noise removal by the signal processing circuit or the signals indicating the coordinates derived by the coordinate extraction circuit as the output signals Vout.

Figure 2:
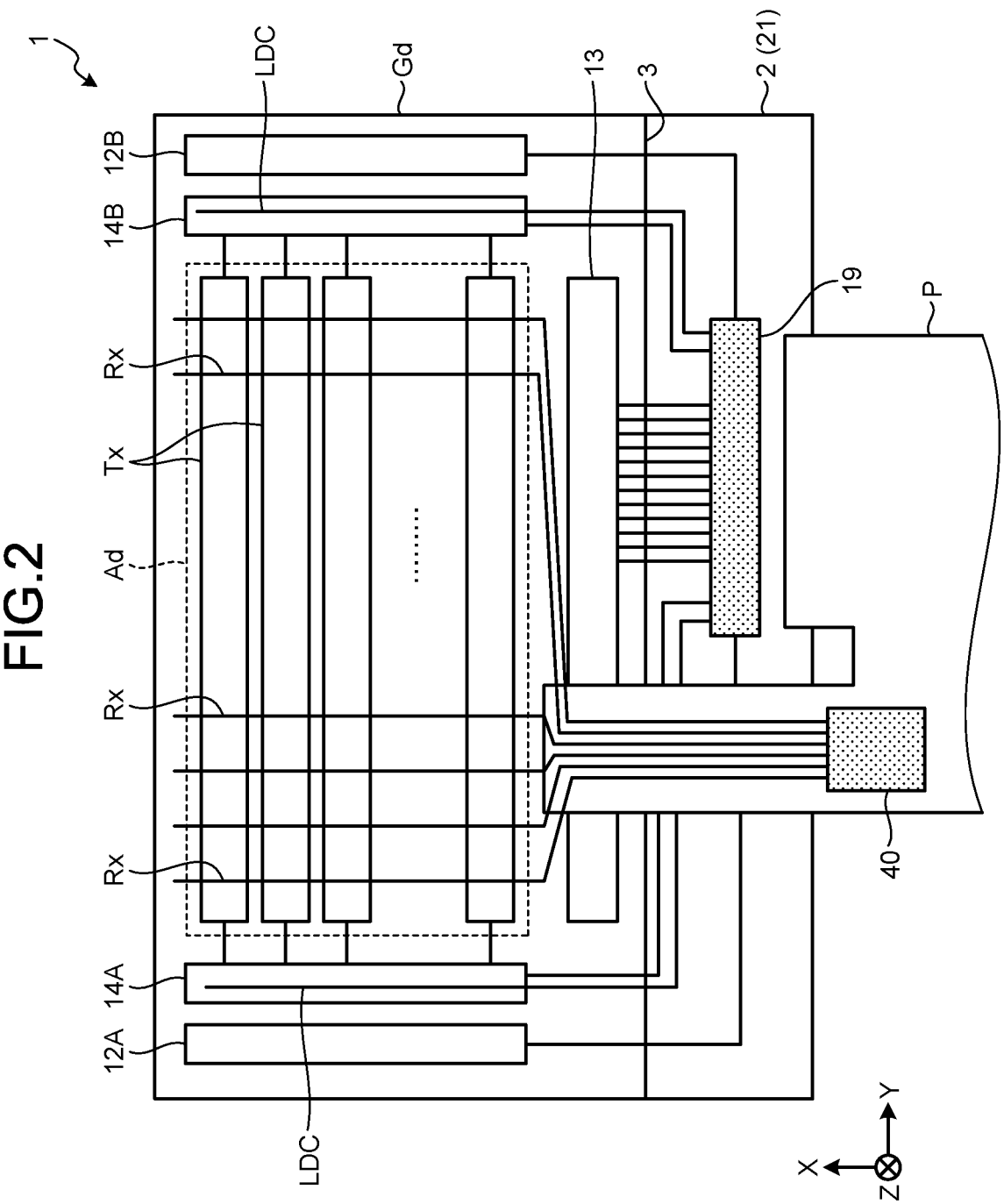
FIG. 2 is a diagram of an example of a module provided with the display device according to the present embodiment.

FIG. 2 is a diagram of an example of a module provided with the display device according to the present embodiment. The display device 1 has a reference plane parallel to a main surface 21a of a substrate 21 included in the display device 1, for example. One direction extending in the reference plane is referred to as an X-direction, and a direction orthogonal to the X-direction is referred to as a Y-direction. The Y-direction is not limited to the direction orthogonal to the X-direction and may be a direction intersecting therewith. A direction orthogonal to the X- and Y-directions is referred to as a Z-direction (refer to FIG. 3). In other words, the Z-direction is the normal direction to the main surface 21a of the substrate 21 (refer to FIG. 3), and planar view is a view of a plane seen from the Z-direction.

The display device 1 includes a pixel substrate 2 (substrate 21), which will be described later, and a wiring substrate P. The wiring substrate P is a flexible printed circuit board, for example. In planar view of the pixel substrate 2 (substrate 21), the pixel substrate 2 (substrate 21) is divided into a display region Ad and a peripheral region Gd of the display portion 20. The pixel substrate 2 includes an IC chip 19. The IC chip 19 is a driver IC mounted on the substrate 21 and is a control device functioning as the control circuit 11 and incorporating circuits necessary for the display operation. The source driver 13 according to the present embodiment is formed on the substrate 21. The source driver 13 may be incorporated in the IC chip 19. The drive electrode driver 14 is formed on the substrate 21. The drive electrode driver 14 includes drive electrode scanners 14A and 14B. The gate driver 12 is formed on the substrate 21 as gate drivers 12A and 12B. The display device 1 may incorporate the circuits, such as the drive electrode scanners 14A and 14B and the gate driver 12, in the IC chip 19. While the IC chip 19 is mounted on the substrate 21, the present embodiment is not limited thereto. The IC chip 19 may be mounted on the wiring substrate P coupled to the substrate 21. In other words, the IC chip 19 may be configured as chip on glass (COG) formed on a glass substrate or as chip on film or chip on flexible (COF) formed on a film substrate.

As illustrated in FIG. 2, the drive electrodes Tx intersect the detection electrodes Rx in planar view of the substrate 21.

The drive electrodes Tx are arrayed in the X-direction and extend in the Y-direction in planar view. The drive electrode Tx has a strip shape. To perform the detection operation, the drive electrodes Tx are sequentially supplied with the drive signals VcomS from the drive electrode driver 14. The drive electrode Tx may have a slit overlapping at least one of a signal line SGL and the scanning line GCL. The drive electrode Tx may have a shape in which a plurality of strip electrodes extending in the Y-direction are coupled by coupling electrodes extending in the X-direction. The strip electrodes may be simultaneously supplied with the drive signals VcomS, thereby functioning as one drive electrode Tx.

The detection electrodes Rx are arrayed in the Y-direction and extend in the X-direction in planar view. The electrode extending direction (first direction) of the detection electrodes Rx according to the present embodiment is the X-direction, and a second direction intersecting the first direction is the Y-direction. The detection electrodes Rx are coupled to the detection circuit 40 mounted on the wiring substrate P via the wiring substrate P. The detection circuit 40 is mounted on the wiring substrate P and is coupled to the detection electrodes Rx disposed in parallel with each other. The wiring substrate P is not limited to a flexible printed circuit board and may be a rigid or rigid flexible substrate. The detection circuit 40 is not necessarily mounted on the wiring substrate P and may be provided on a control substrate coupled via the wiring substrate P. While the detection circuit 40 according to the present embodiment is a detection driver IC mounted on the wiring substrate P, some of the functions of the detection circuit 40 may be provided as the functions of an MPU mounted on another control substrate. Specifically, the detection driver IC may include the amplification circuit and the A/D conversion circuit, for example, and the signal processing circuit and the coordinate extraction circuit may be implemented by a circuit, such as an MPU, provided separately from the detection driver IC. The detection circuit 40 may be incorporated in the IC chip 19 (one-chip configuration). In this case, the detection signals may be transmitted to the IC chip 19 on the array substrate via wiring of the wiring substrate P, for example.

The source driver 13 is formed in the peripheral region Gd on the substrate 21. In the display region Ad, a number of sub-pixels SPix, which will be described later, are disposed in a matrix (row-column configuration). The peripheral region Gd is a region outside the display region Ad and is a region not provided with the sub-pixels SPix on the substrate 21 in planar view. The gate driver 12 and the drive electrode driver 14 are disposed in the peripheral region Gd.

The gate driver 12 includes the gate drivers 12A and 12B, for example, and is configured by TFT elements on the substrate 21. The gate drivers 12A and 12B are disposed on both sides in the Y-direction so as to sandwich the display region Ad in which the sub-pixels SPix (pixels), which will be described later, are disposed in a matrix (row-column configuration). The scanning lines GCL (refer to FIGS. 4 and 5) are arrayed between the gate drivers 12A and 12B. Therefore, the scanning lines GCL are provided extending in a direction parallel to the electrode extending direction (first direction) of the detection electrodes Rx. In the configuration according to the present embodiment, two circuits are provided as the gate drivers 12A and 12B. This is given by way of an example of a specific configuration of the gate driver 12, and the present embodiment is not limited thereto. The gate driver 12, for example, may be one circuit provided only at one end of the scanning lines GCL. In addition, the scanning lines GCL coupled to the gate drivers 12A and 12B may be the same or different lines.

The drive electrode driver 14 is configured by TFT elements on the substrate 21. The drive electrode driver 14 supplies the display drive signals VcomD to the common electrodes (drive electrodes Tx for detection) via display wiring LDC in a display period and supplies the detection drive signals VcomS to the common electrodes (drive electrodes Tx for detection) via detection wiring in a detection period. The drive electrode scanner 14A is coupled to one end of the drive electrodes Tx in the Y-direction, and the drive electrode scanner 14B is coupled to the other end of the drive electrodes Tx. The display wiring LDC that supplies the display drive signals VcomD is disposed in the peripheral region Gd. While two circuits of the drive electrode scanners 14A and 14B are provided as the drive electrode driver 14 according to the present embodiment, only one of them may be provided. The drive electrodes Tx coupled to the drive electrode scanners 14A and 14B may be the same or different electrodes.

Figure 3:
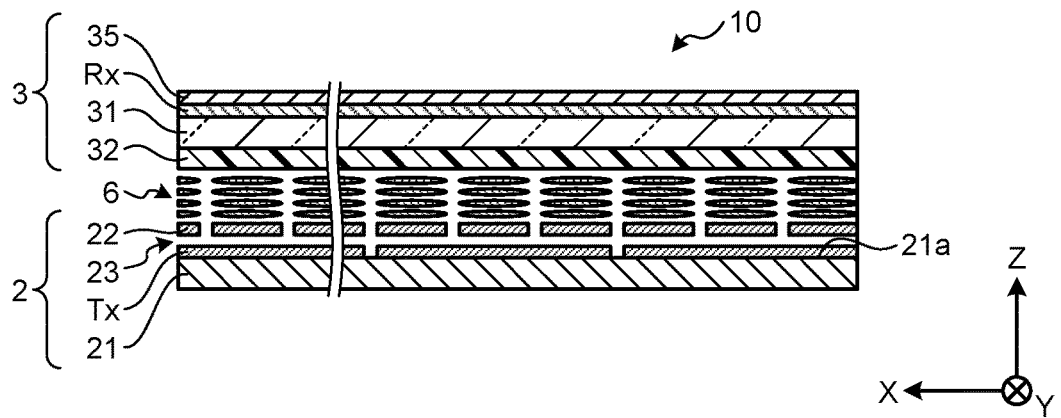
FIG. 3 is a sectional view of a schematic sectional structure of the display device according to the present embodiment.

The following describes an example of the configuration of the panel portion 10 in greater detail. FIG. 3 is a sectional view of a schematic sectional structure of the display device according to the present embodiment. As illustrated in FIG. 3, the panel portion 10 includes the pixel substrate 2, a counter substrate 3, and a display functional layer. The counter substrate 3 is disposed facing the pixel substrate 2 in the Z-direction. The display functional layer is disposed between the pixel substrate 2 and the counter substrate 3. The display functional layer is a liquid crystal layer 6, for example.

The pixel substrate 2 includes the substrate 21, a plurality of pixel electrodes 22, the drive electrodes Tx, and an insulating layer 23. The substrate 21 serves as a circuit board. The pixel electrodes 22 are arrayed in a matrix (row-column configuration) on the substrate 21. The drive electrodes Tx are formed between the substrate 21 and the pixel electrodes 22. The insulating layer 23 insulates the pixel electrodes 22 from the drive electrodes Tx. The substrate 21 includes a wiring layer between the pixel electrodes 22 and the substrate 21. The wiring layer is provided with thin film transistors (TFTs) constituting a pixel circuit that drives the sub-pixels Spix in the display region Ad and peripheral circuits (e.g., the drive electrode driver 14) formed in the peripheral region Gd. A polarizing plate (not illustrated) may be provided under the substrate 21 with an adhesive layer interposed therebetween.

While the drive electrodes Tx, the insulating layer 23, and the pixel electrodes 22 are stacked in this order on the substrate 21 according to the present embodiment, the embodiment is not limited thereto. The pixel electrodes 22, the insulating layer 23, and the drive electrodes Tx may be stacked in this order on the substrate 21. Alternatively, the pixel electrodes 22 and the drive electrodes Tx may be formed in the same layer with an insulating layer interposed therebetween. Still alternatively, at least one of the pixel electrodes 22 and the drive electrodes Tx may be disposed on a substrate 31.

The counter substrate 3 includes the substrate 31 and a color filter 32. The substrate 31 is made of insulating material. The color filter 32 is formed on a facing surface of the substrate 31 facing the substrate 21. The detection electrodes Rx are disposed on the surface opposite to the facing surface of the substrate 31 facing the substrate 21. The detection electrodes Rx are disposed apart from each other in the Y-direction (refer to FIGS. 2 and 6). A non-detection regions CP is formed between the detection electrodes Rx (refer to FIG. 6). The non-detection regions CP is provided with dummy electrodes 120, which will be described later (refer to FIG. 6). As illustrated in FIG. 3, a polarizing plate 35 is provided on the detection electrodes Rx and the dummy electrodes 120 (not illustrated in FIG. 3) with an adhesive layer interposed therebetween. The color filter 32 may be disposed on the substrate 21. The substrate 21 and the substrate 31 are glass substrates, for example. At least one of the substrates 21 and 31 is not limited to a glass substrate and may be a film substrate made of organic material, such as polyimide.

The liquid crystal layer 6 serving as the display functional layer is provided between the substrate 21 and the substrate 31. The liquid crystal layer 6 modulates light passing therethrough according to the state of an electric field. The liquid crystal layer 6, for example, may be made of liquid crystal for a lateral electric field mode, such as in-plane switching (IPS) including fringe field switching (FFS). Orientation films may be provided between the liquid crystal layer 6 and the pixel substrate 2 and between the liquid crystal layer 6 and the counter substrate 3 illustrated in FIG. 5. The liquid crystal layer 6 may be made of liquid crystal for a vertical electric field.

An illuminator, which is not illustrated, is provided under the substrate 21. The illuminator includes a light source, such as light-emitting diodes (LEDs), and outputs light from the light source toward the substrate 21. The light output from the illuminator passes through the pixel substrate 2. The display device 1 switches the part from which the light is blocked and not output and the part from which the light is output according to the state of the liquid crystal at each position, thereby displaying an image on the display surface. If the display portion 20 is a reflective liquid crystal display panel, for example, the pixel electrodes 22 are made of reflective material that reflects light incident from the substrate 31, the drive electrodes Tx made of translucent conductive material are provided on the side closer to the counter substrate 3, and the illuminator need not be provided under the substrate 21. If the display portion 20 is a reflective liquid crystal display panel, an illuminator (front light) that outputs light toward the substrate 21 may be provided on the substrate 31. If the display portion 20 is a light-emitting display panel including light-emitting elements as the display elements, the display functional layer serves as a light-emitting layer and is disposed between anode electrodes and cathode electrodes corresponding to the pixel electrodes 22 and the drive electrodes Tx, for example. The light-emitting display panel need not be provided with an illuminator because it displays an image by controlling the amount of light from self-emitting bodies. If the light-emitting elements output different colors, the color filter 32 need not be provided.

Figure 4:
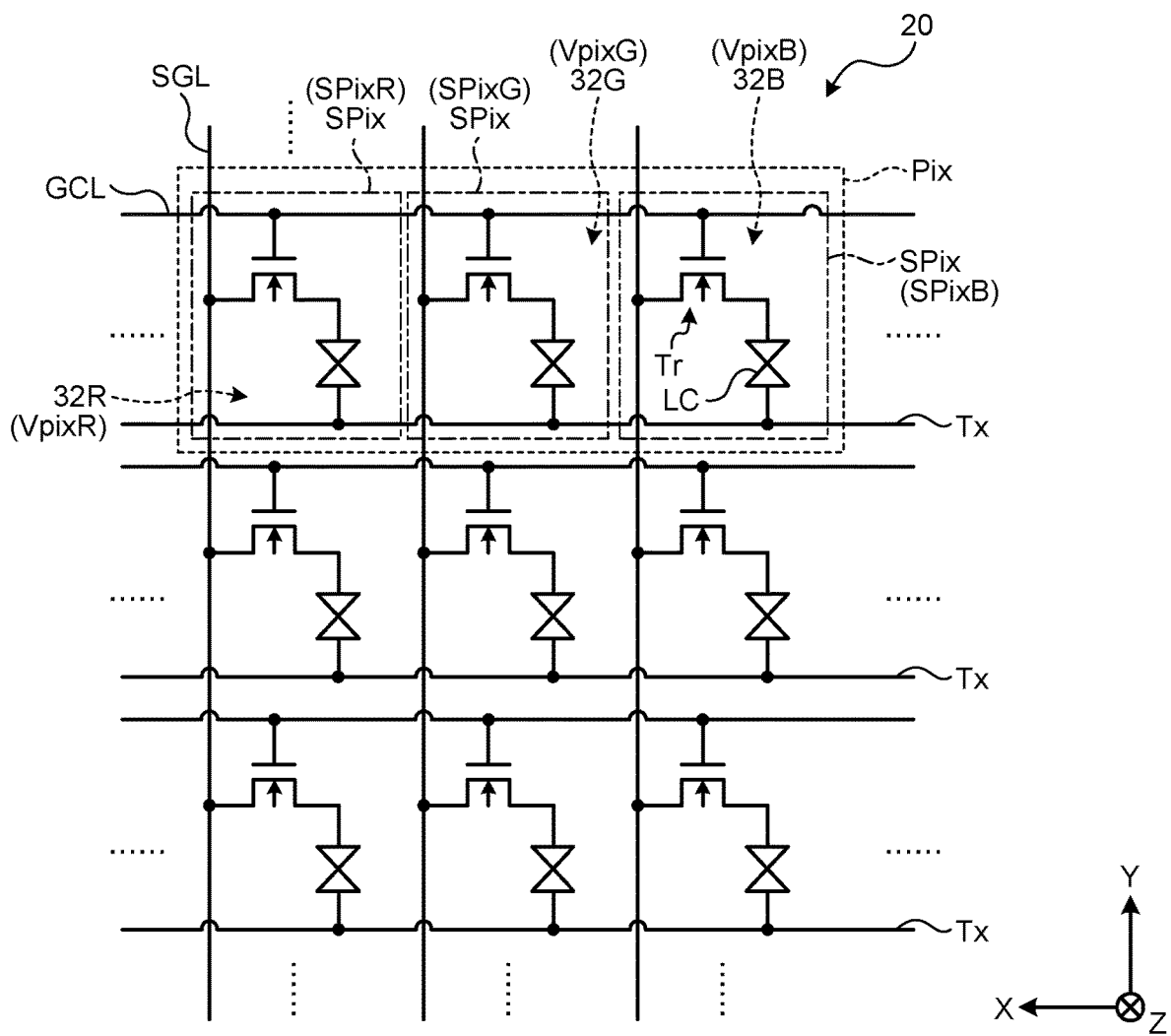
FIG. 4 is a circuit diagram of a pixel array of a display unit according to the present embodiment.

FIG. 4 is a circuit diagram of a pixel array of the display portion according to the present embodiment. The substrate 21 illustrated in FIG. 3 is provided with switching elements Tr and wiring, such as the signal lines SGL and the gate lines GCL illustrated in FIG. 4. The switching element Tr constitutes the pixel circuit of each sub-pixel SPix. The signal line SGL supplies the pixel signals Vpix to the pixel electrodes 22. The scanning line GCL drives the switching elements Tr. The signal lines SGL and the scanning lines GCL are formed in the wiring layer and extend on a plane parallel to the surface of the substrate 21. More specifically, the signal lines SGL extend in the X-direction, and the scanning lines GCL extend in the Y-direction. While the display circuit for driving each sub-pixel SPix is configured by one switching element Tr in the configuration according to the present embodiment, the embodiment is not limited thereto. The display circuit may be configured by a plurality of the switching elements Tr, or some pieces of wiring may be shared by a plurality of the sub-pixels SPix.

The display portion 20 illustrated in FIG. 4 includes the sub-pixels SPix arrayed in a matrix (row-column configuration). Each of the sub-pixels SPix includes the switching element Tr serving as the display circuit and a liquid crystal element LC serving as the display element. The switching element Tr is configured by a thin film transistor and is configured by an n-channel metal oxide semiconductor (MOS)-type TFT in this example. One of the source and the drain of the switching element Tr is coupled to the signal line SGL. The gate of the switching element Tr is coupled to the scanning line GCL. The other of the source and the drain of the switching element Tr is coupled to a first end of the liquid crystal element LC. The first end of the liquid crystal element LC is coupled to the other of the source and the drain of the switching element Tr, and a second end thereof is coupled to the drive electrode Tx.

The sub-pixel SPix is coupled to the other sub-pixels SPix belonging to the same row in the display portion 20 by the scanning line GCL. The scanning lines GCL are coupled to the gate driver 12 and are supplied with the scanning signals Vscan from the gate driver 12. The sub-pixel SPix is coupled to the other sub-pixels SPix belonging to the same column in the display portion 20 by the signal line SGL. The signal lines SGL are coupled to the source driver 13 and are supplied with the pixel signals Vpix from the source driver 13. The drive electrode Tx is disposed facing at least the pixel electrodes 22 arrayed in the Y-direction. In other words, the sub-pixels SPix arrayed in the Y-direction share one drive electrode Tx in the display operation. The drive electrodes Tx are coupled to the drive electrode driver 14 and are supplied with the drive signals Vcom from the drive electrode driver 14. Specifically, the sub-pixels SPix facing one drive electrode Tx are supplied with the display drive signals VcomD at the same timing in the display operation, and the drive electrodes Tx are sequentially supplied with the detection drive signals VcomS in the detection operation. The sub-pixels Spix according to the present embodiment include sub-pixels SPixR, sub-pixels SPixG, and sub-pixels SPixB. The sub-pixels SPixR receive pixel signals VpixR corresponding to the first color (red). The sub-pixels SPixG receive pixel signals VpixG corresponding to the second color (green). The sub-pixels SPixB receive pixel signals VpixB corresponding to the third color (blue). The sub-pixels SPix may include sub-pixels SPix corresponding to four or more colors. The sub-pixels SPix, for example, may include sub-pixels that receive pixel signals corresponding to white.

The color filter 32, for example, has color regions 32R, 32G, and 32B colored in three colors of the first color (red), the second color (green), and the third color (blue), respectively. The color regions 32R, 32G, and 32B are disposed corresponding to the sub-pixels SPixR, SPixG, and SPixB, respectively, illustrated in FIG. 4. In other words, one of the color regions 32R, 32G, and 32B is disposed in the vertical direction (Z-direction) with respect to each sub-pixel SPix.

Figure 5:
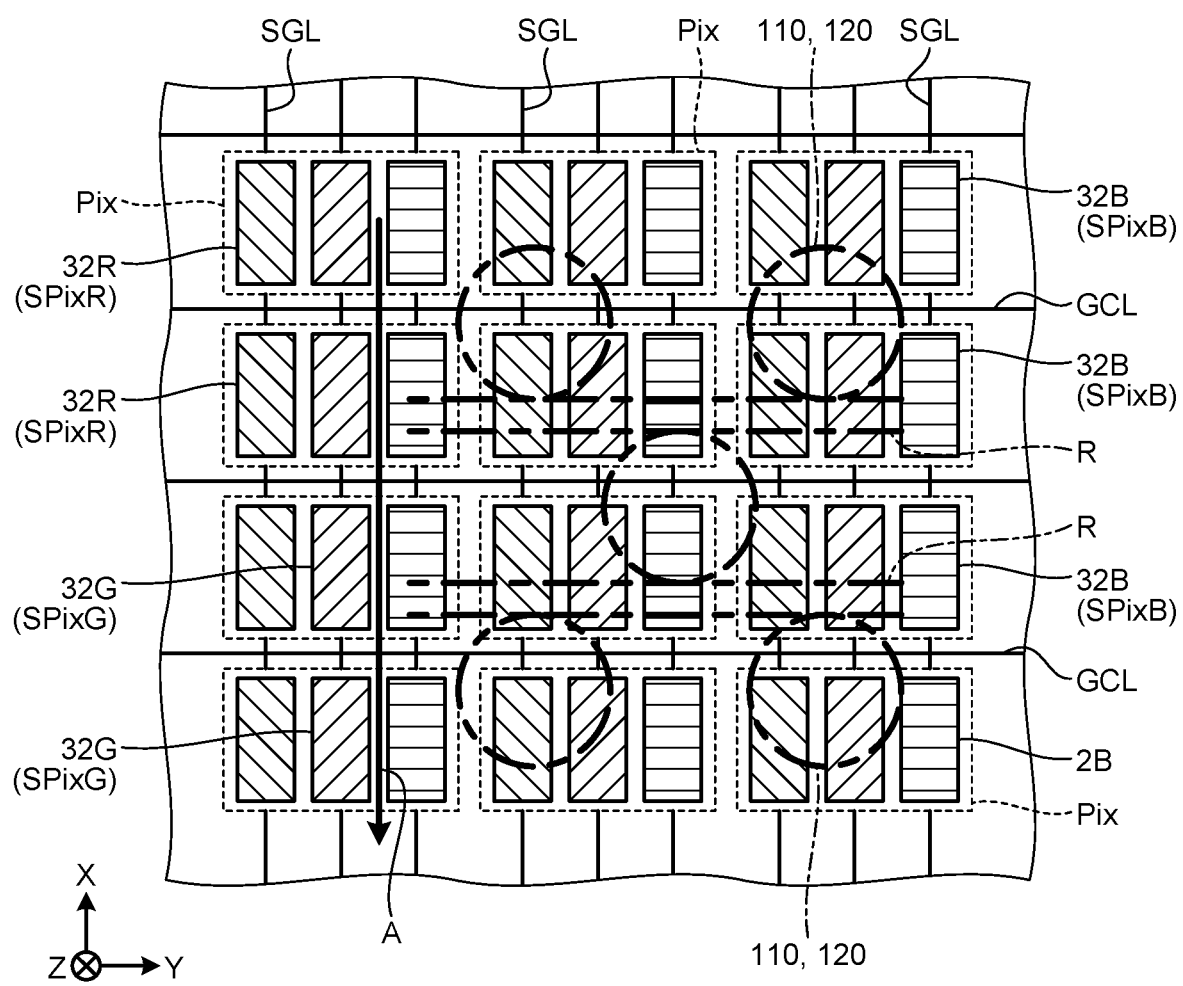
FIG. 5 is a schematic of the relation between sub-pixels and detection electrodes.

FIG. 5 is a schematic of the relation between the sub-pixels and the detection electrodes. The sub-pixels SPixR (color region 32R) in FIG. 5 are hatched by oblique lines gradually extending downward from left to right. The sub-pixels SPixG (color region 32G) in FIG. 5 are hatched by oblique lines gradually extending downward from right to left. The sub-pixels SPixB (color region 32B) in FIG. 5 are hatched by straight lines extending vertically. As illustrated in FIG. 5, the sub-pixels SPix are periodically arrayed in order of the sub-pixels SPixR, SPixG, and SPixB in the X-direction. The sub-pixels SPix that receive the pixel signals Vpix corresponding to the same color are arrayed in the Y-direction. Specifically, the color region 32R of a first pixel Pix, for example, is disposed continuously with the color region 32R of a second pixel Pix in the Y-direction (second direction). The direction in which the sub-pixels SPix that receive the pixel signals Vpix corresponding to the same color are arrayed is referred to as a same color array direction A (refer to the arrow in FIG. 5). The same color array direction A is the X-direction (second direction).

Figure 6:
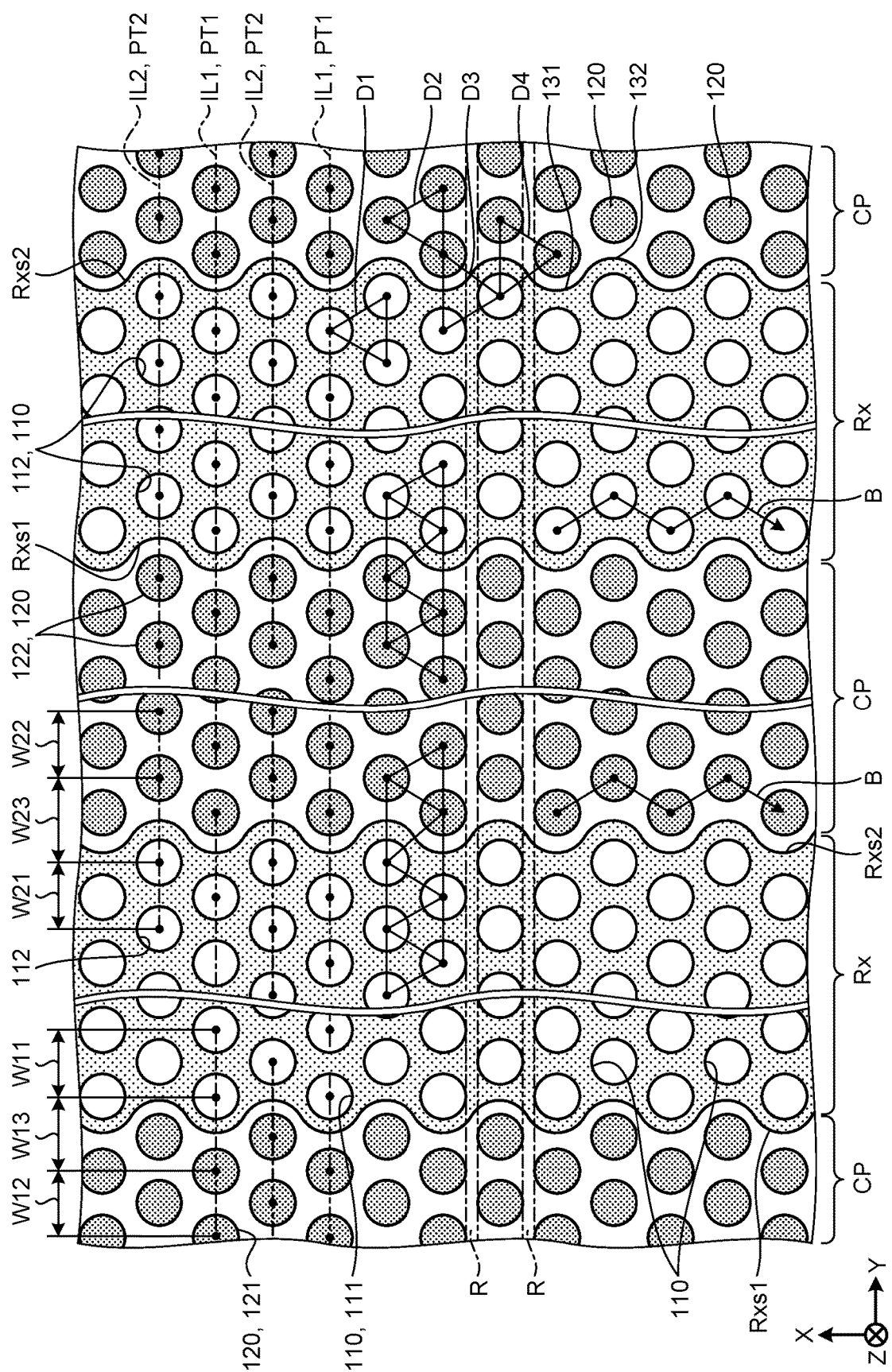
FIG. 6 is a schematic of the detection electrodes and a non-detection region in planar view.
Figure 7:
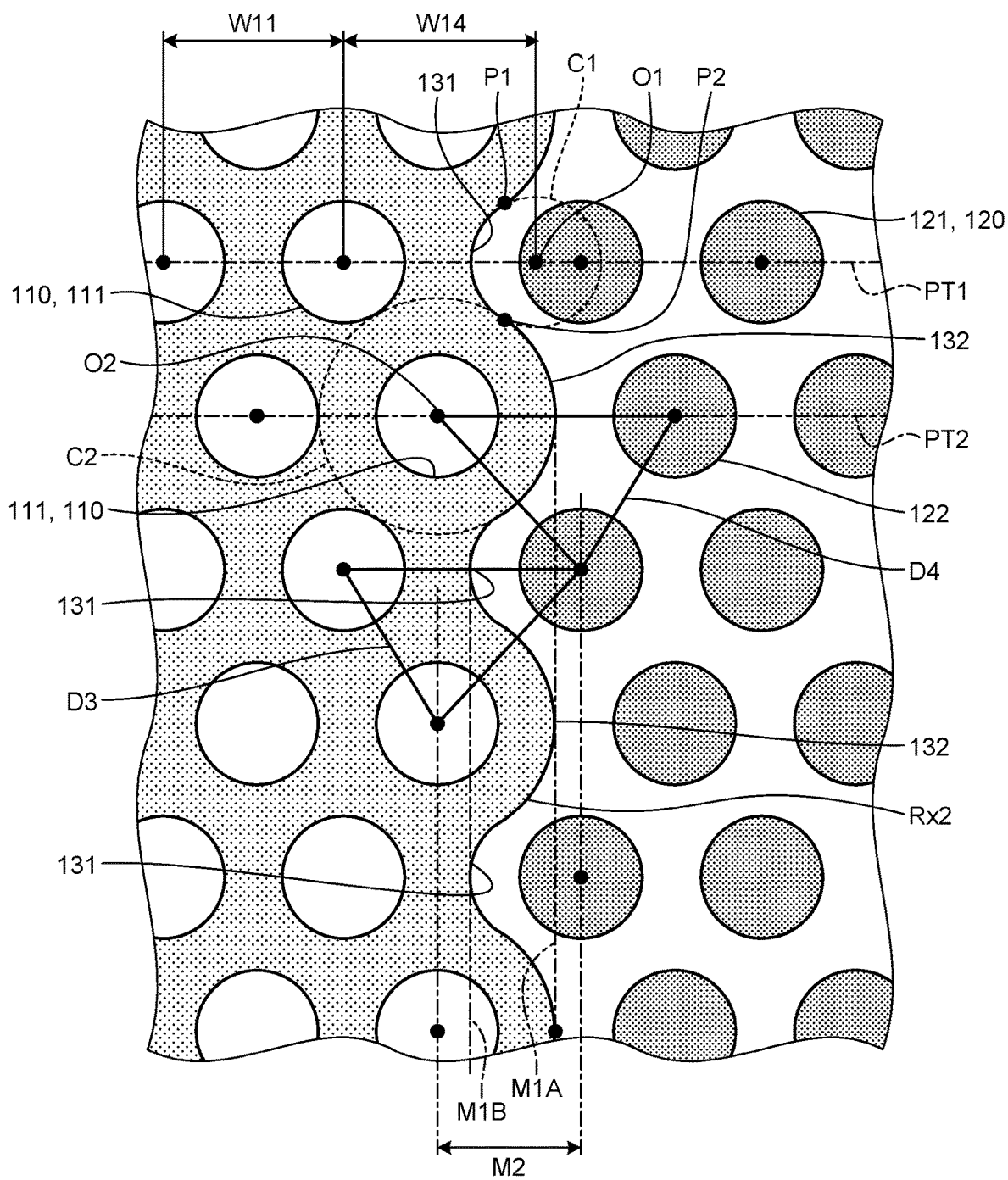
FIG. 7 is an enlarged view of a part around an end of the detection electrode illustrated in FIG. 6.

The following describes the detection electrodes Rx and the dummy electrodes 120. FIG. 6 is a schematic of the detection electrodes and the non-detection region in planar view. FIG. 7 is an enlarged view of a part around an end of the detection electrode illustrated in FIG. 6. In FIGS. 6 and 7, formation regions in which conductive material is formed are shaded with dots. Regions in which no conductive material is formed are not shaded with dots.

As illustrated in FIG. 6, the detection electrodes Rx extend in the X-direction (first direction). The detection electrodes Rx are disposed apart from each other in the Y-direction (second direction). The detection electrode Rx is made of translucent conductive material, such as indium tin oxide (ITO). The detection electrode Rx is not necessarily made of ITO and may be made of other metals or metal oxides. Ends Rxs1 and Rxs2 extending in the X-direction are formed at the ends of the detection electrode Rx in the Y-direction. The detection electrode Rx has a plurality of openings 110 in planar view. The opening 110 according to the present embodiment is a region not provided with the conductive material constituting the detection electrode Rx in planar view, and more specifically is a region surrounded by the conductive material constituting one detection electrode Rx. The opening 110 has a circular shape.

The dummy electrodes 120 are provided in the non-detection region CP. The dummy electrode 120 has a circular shape in planar view. The dummy electrode 120 is not coupled to a detection circuit DET. The dummy electrode 120 is made of translucent conductive material, such as ITO, which is the same conductive material as that of the detection electrode Rx.

The opening 110 of the detection electrode Rx and the dummy electrode 120 have substantially the same shape. Forming the opening 110 and the dummy electrode 120 in a circular shape suppresses a change in reflectance of external light if the relative angle between a user and the device is different. The shape of the opening 110 and the dummy electrode 120 according to the present embodiment is not strictly limited to a circular arc. The shape may be a circular arc formed by a polygon composed of a plurality of connected straight lines or may be an ellipse or other shapes. The opening 110 of the detection electrode Rx and the dummy electrode 120 have substantially the same size. The openings 110 of the detection electrodes Rx and the dummy electrodes 120 are arrayed with regularity. The openings 110 of the detection electrodes Rx and the dummy electrodes 120 constitute arrays. The following describes the regularity of the arrays with reference to FIG. 6.

In FIG. 6, a virtual line IL1 extending in the Y-direction is a line connecting the centers of openings 111 and the centers of dummy electrodes 121 included in a first array PT1. A virtual line L2 extending in the Y-direction is a line connecting the centers of openings 112 and the centers of dummy electrodes 122 included in a second array PT2. The openings 111 refer to openings belonging to the first array PT1 out of the openings 110. The dummy electrodes 121 refer to dummy electrodes belonging to the first array PT1 out of the dummy electrodes 120. The openings 112 refer to openings belonging to the second array PT2 out of the openings 110. The dummy electrodes 122 refer to dummy electrodes belonging to the second array PT.

As illustrated in FIG. 6, the arrays include the first arrays PT1 and the second arrays PT2 adjacent to the first arrays PT1 in the X-direction. The first arrays PT1 and the second arrays PT2 are alternately arrayed in the X-direction. In other words, the openings 110 of the detection electrodes Rx and the dummy electrodes 120 according to the embodiment belong to either the first array PT1 or the second array PT2 in which they are periodically arrayed in the Y-direction.

In the first array PT1, the openings 111 are arrayed such that the distance between the centers of the openings 111 adjacent to each other in the Y-direction is W11. The dummy electrodes 121 are arrayed such that the distance between the centers of the dummy electrodes 121 adjacent to each other in the Y-direction is W12. W11 and W12 are the same distance. The distance between the centers of the opening 111 and the dummy electrode 121 adjacent to each other across the end Rxs1 or Rxs2 of the detection electrode Rx is W13, which is longer than W11 and W12.

In the second array PT2, the openings 112 are arrayed such that the distance between the centers of the openings 112 adjacent to each other in the Y-direction is W21. The dummy electrodes 122 are arrayed such that the distance between the centers of the dummy electrodes 122 adjacent to each other in the Y-direction is W22. The distance W21 and the distance W22 are the same distance. The distance between the centers of the opening 112 and the dummy electrode 122 adjacent to each other across the end Rxs1 or Rxs2 of the detection electrode Rx is W23, which is longer than W21 and W22.

In the relation between the first array PT1 and the second array PT2, W11, W12, W21, and W22 are substantially the same distance. W13 and W23 are substantially the same distance. Thus, the openings 110 and the dummy electrodes 120 belonging to the first array PT1 and the second array PT2 are arrayed in the same cycle in the Y-direction.

The opening 111 belonging to the first array PT1 is formed in a triangular grid with two openings 110 of the detection electrode Rx belonging to the second array PT2 (refer to a virtual triangle D1 in FIG. 6). Alternatively, the opening 111 belonging to the first array PT1 is formed in a triangular grid with the opening 110 of the detection electrode Rx and the dummy electrode 120 belonging to the second array PT2 (refer to a virtual triangle D3 in FIG. 6). The dummy electrode 120 belonging to the first array PT1 is disposed in a triangular grid with two dummy electrodes 120 belonging to the second array PT2 (refer to a virtual triangle D2 in FIG. 6). The dummy electrode 120 belonging to the first array PT1 is disposed in a triangular grid with the dummy electrode 120 and the opening 110 of the detection electrode Rx belonging to the second array PT2 (refer to a virtual triangle D4 in FIG. 6). Thus, the openings 111 and the dummy electrodes 121 belonging to the first array PT1 are shifted in the Y-direction with respect to the openings 112 and the dummy electrodes 122 belonging to the second array PT2, and all the openings 110 of the detection electrodes Rx and the dummy electrodes 120 are arrayed in a triangular grid. Therefore, as indicated by the arrows B in FIG. 6, the openings 110 of the detection electrodes Rx and the dummy electrodes 120 are each arrayed in the X-direction (first direction) in a manner alternately shifted to one side and the other in the Y-direction (second direction).

If the virtual triangle D1 is formed by connecting the centers of three adjacent openings 110 with virtual lines in the detection electrode Rx, the virtual triangle D1 is an equilateral triangle. Thus, the openings 110 are arrayed in an equilateral triangular grid. Similarly, if the virtual triangle D2 is formed by connecting the centers of three adjacent dummy electrodes 120 with virtual lines in the non-detection region CP, the virtual triangle D2 is an equilateral triangle. Thus, the dummy electrodes 120 are arrayed in an equilateral triangular grid.

The virtual triangle D1 and the virtual triangle D2 have the same size because the distances W11, W12, W21, and W22 are substantially the same length as described above. The opening 110 of the detection electrode Rx and the dummy electrode 120 have the same diameter. If the diameter of the opening 110 and the dummy electrode 120 is too large, the occupancy ratio of the conductive material decreases in the virtual triangle D1 and increases in the virtual triangle D2. By contrast, if the diameter of the opening 110 and the dummy electrode 120 is too small, the occupancy ratio of the conductive material increases in the virtual triangle D1 and decreases in the virtual triangle D2. If there are variations in the occupancy ratio of the conductive material in the plane including the detection electrodes Rx and the non-detection region CP, the reflectance to incident light is not uniform, thereby deteriorating an image quality displayed on the display surface. The diameter of the opening 110 and the dummy electrode 120 according to the present embodiment is adjusted such that the occupancy ratio of the conductive material is approximately 50% in the virtual triangles D1 and D2. In other words, the occupancy ratios of the conductive material are substantially equal in the center part of the detection electrode Rx where the virtual triangles D1 are formed and the non-detection region CP where the virtual triangles D2 are formed.

W13 and W23 are longer than W11, W12, W21 and W22. For this reason, if the virtual triangles D3 and D4 are formed by connecting the centers of the openings 110 along the ends Rxs1 and Rxs2 of the detection electrode Rx and the centers of the dummy electrodes 120 with virtual lines, the virtual triangles D3 and D4 are not equilateral triangles. As a result, the occupancy ratio of the conductive material is not approximately 50% in the virtual triangles D3 and D4.

With the configuration described above, the detection electrodes Rx and the non-detection region CP also have continuous regions R linearly extending in the X-direction (first direction) and provided with no opening 110 or no dummy electrode 120 as illustrated in FIG. 6.

As illustrated in FIG. 5, the continuous regions R intersect the same color array direction A of the sub-pixels SPix. In other words, the continuous regions R overlap all the color regions 32R, 32G, and 32B of the color filter 32. Therefore, moiré (interference fringes) hardly occurs.

If the extending direction of the continuous region R and the same color array direction A of the sub-pixels SPix are the same direction, the continuous region R continues to overlap one of the sub-pixels SPixR, SPixG and SPix. In other words, continuous regions R1 and R2 continue to overlap one of the color regions 32R, 32G, and 32B. Therefore, light in the color with which the continuous region R overlaps and light in the other two colors do not have the same intensity. As a result, there are variations in the intensities of light transmitted through the three color regions 32R, 32G, and 32B, thereby causing moiré.

The following describes the ends Rxs1 and Rxs2 of the detection electrode Rx. As illustrated in FIG. 6, the ends Rxs1 and Rxs2 of the detection electrode Rx each have recesses 131 and protrusions 132. The recess 131 has a circular arc shape recessed toward the inside of the detection electrode Rx in the Y-direction. The protrusion 132 has a circular arc shape protruding toward the outside of the detection electrode Rx in the Y-direction. The recesses 131 and the protrusions 132 are alternately and continuously formed in the X-direction. As a result, the ends Rxs1 and Rxs2 of the detection electrode Rx have a wave shape that alternately rises and falls from one side to the other in the Y-direction (second direction).

More specifically, as illustrated in FIG. 7, the recesses 131 are formed along first virtual circles C1 periodically arrayed in the X-direction. Similarly, the protrusions 132 are formed along second virtual circles C2 periodically arrayed in the X-direction. In other words, the recess 131 overlaps part of the first virtual circle C1, and the protrusion 132 overlaps part of the second virtual circle C2.

The first virtual circles C1 are formed apart from each other in the X-direction. The virtual line IL1 of the first array PT1 passes through centers O1 of the first virtual circles C1. The distance between the center O1 of the first virtual circle C1 and the center of the opening 111 along the ends Rxs1 and Rxs2 of the first array PT1 is W14. The distance W14 is equal to the distance W11. In addition, the radius of the first virtual circle C1 is equal to the radius of the opening 111.

The second virtual circles C2 are formed apart from each other in the X-direction and between the first virtual circles C1. A center O2 of the second virtual circle C2 coincides with the center of the opening 112 belonging to the second array PT2 and formed along the ends Rxs1 and Rxs2. Therefore, the virtual line IL2 of the second array PT2 passes through the centers O2 of the second virtual circles C2. The second virtual circle C2 is tangent to the two first virtual circles C1 adjacent to each other in the X-direction and has points of tangency P1 and P2.

The recess 131 and the protrusion 132 extend between the points of tangency P1 and P2 on the first virtual circle C1 and the second virtual circle C2. In other words, the end of the recess 131 and the end of the protrusion 132 are coupled on the points of tangency P1 and P2. Thus, the ends Rxs1 and Rxs2 of the detection electrode Rx according to the embodiment have the recesses 131 and the protrusions 132 alternately disposed in the X-direction and have no straight line part extending linearly. Therefore, light incident on the ends Rxs1 and Rxs2 are refracted at various angles. As a result, the ends Rxs1 and Rxs2 of the detection electrode Rx according to the embodiment make linear reflected light hard to visually recognize.

As described above, the virtual line IL1 of the first array PT1 passes through the centers O1 of the first virtual circles C1. The virtual line IL2 of the second array PT2 passes through the centers O2 of the second virtual circles C2. In other words, the cycle in the X-direction (first direction) in which the recesses 131 and the protrusions 132 are formed coincides with the cycle in which the first arrays PT1 and the second arrays PT2 are arrayed. Therefore, as indicated by the arrows B in FIG. 6, the wave shape of the ends Rxs1 and Rxs2 of the detection electrodes Rx coincides with the cycle in which the openings 110 and the dummy electrodes 120 arrayed in the X-direction (first direction) are alternately shifted to one side and the other in the Y-direction (second direction).

As illustrated in FIG. 7, the configuration described above enables the dummy electrodes 120 disposed along the ends Rxs1 and Rxs2 to be disposed closer to the detection electrode Rx beyond a virtual line M1A connecting the apexes of the protrusions 132. In addition, the configuration enables the openings 110 formed along the ends Rxs1 and Rxs2 to be formed closer to the dummy electrodes 120 beyond a virtual line M1B connecting the apexes of the recesses 131. In other words, the configuration can decrease the distances W13 and W23 between the opening 110 and the dummy electrode 120 disposed across the ends Rxs1 and Rxs2.

The distance W13 according to the present embodiment is (W11+W12)×0.66. The distance W23 is (W21+W22)×0.66. Let us assume a case where the opening 110 of the detection electrode Rx and the dummy electrode 120 have the same diameter, and the diameter of the opening 110 and the dummy electrode 120 is adjusted such that the occupancy ratio of the conductive material is approximately 50% in the virtual triangles D1 and D2. In this case, when the distance W13 satisfies (W11+W12)×0.66, and the distance W23 satisfies (W21+W22)×0.66, the occupancy ratio of the conductive material is approximately 53.5% in the virtual triangle D3 and is approximately 46.7% in the virtual triangle D4 regardless of the distances of W11 and W21. Table 1 below shows the occupancy ratio of the conductive material in the virtual triangle D3 and in the virtual triangle D4 when the distances W11 and W21 are changed.

TABLE 1

| Length of W11 and W21 (µm) | Occupancy Ratio of Conductive Material in Virtual Triangle D3 | Occupancy Ratio of Conductive Material in Virtual Triangle D4 |
| --- | --- | --- |
| 80 | 53.28 | 46.78 |
| 70 | 53.27 | 46.77 |
| 60 | 53.29 | 46.82 |
| 50 | 53.30 | 46.79 |
| 40 | 53.29 | 46.79 |
| 30 | 53.29 | 46.72 |

As indicated by Table 1, the occupancy ratio of the conductive material is 53.5% in the virtual triangle D3. The occupancy ratio of the conductive material is 46.7% in the virtual triangle D4. The occupancy ratio of the conductive material in the whole region combining the virtual triangles D3 and D4 is approximately 50%. Therefore, the occupancy ratio of the conductive material can be 50% at the boundary of the detection electrode Rx. As indicated by the arrow M2 in FIG. 7, the boundary of the detection electrode Rx is the area sandwiched between a virtual line connecting the centers of the dummy electrodes 121 of the first array PT1 adjacent to the ends Rxs1 and Rxs2 and a virtual line connecting the centers of the openings 112 of the second array PT2 adjacent to the ends Rxs1 and Rxs2. The distances W13 and W23 described above are given by way of example only and are not limited thereto.

As described above, the first embodiment prevents reflected light reflected by the ends Rxs1 and Rxs2 of the detection electrodes Rx from being linear light. The detection electrodes Rx and the non-detection region CP are provided with the openings 110, the dummy electrodes 120, the recesses 131, and the protrusions 132 formed into a circular or circular arc shape. As a result, transmitted light passing through the counter substrate 3 (refer to FIG. 3) is refracted at various angles by the openings 110, the dummy electrodes 120, the recesses 131, and the protrusions 132. Therefore, the mesh shape formed by the drive electrodes Tx and the detection electrodes Rx is hard to visually recognize.

The first embodiment enables the dummy electrodes 120 disposed along the ends Rxs1 and Rxs2 to be disposed closer to the detection electrode Rx beyond the virtual line M1A connecting the apexes of the protrusions 132. Similarly, the first embodiment enables the openings 110 formed along the ends Rxs1 and Rxs2 to be formed closer to the detection electrode Rx beyond the virtual line M1B connecting the apexes of the recesses 131. In other words, the first embodiment can decrease the distances W13 and W23 between the opening 110 and the dummy electrode 120 disposed across the ends Rxs1 and Rxs2 of the detection electrode Rx and adjust the occupancy ratio of the conductive material.

The recess 131 overlaps the first virtual circle C1 having the same shape as that of the opening 111 belonging to the first array PT1. The protrusion 132 is concentric with the opening 112 belonging to the second array PT2. The recess 131 and the protrusion 132 have high regularity with the first array PT1 and the second array PT2, respectively. As a result, the mesh shape formed by the drive electrodes Tx and the detection electrodes Rx is harder to visually recognize.

The distance W13 between the centers of the opening 111 and the dummy electrode 121 included in the first array PT1 and adjacent to the recess 131 is equal to the distance W23 between the centers of the opening 112 and the dummy electrode 122 included in the second array PT2 and adjacent to the protrusion 132. Therefore, the openings 111 and the dummy electrodes 121 and the openings 112 and the dummy electrodes 122 sandwiching the ends Rxs1 and Rxs2 are arrayed with regularity. As a result, the mesh shape formed by the drive electrodes Tx and the detection electrodes Rx is harder to visually recognize.

The continuous regions R formed in the detection electrodes Rx and the non-detection region CP overlap all the color regions 32R, 32G, and 32B of the color filter 32. Therefore, moiré (interference fringes) hardly occurs.

The following describes modifications and other embodiments of the present disclosure. The modifications and other embodiments have the same configuration as that of the first embodiment, except for items of special note.

First Modification

Figure 8:
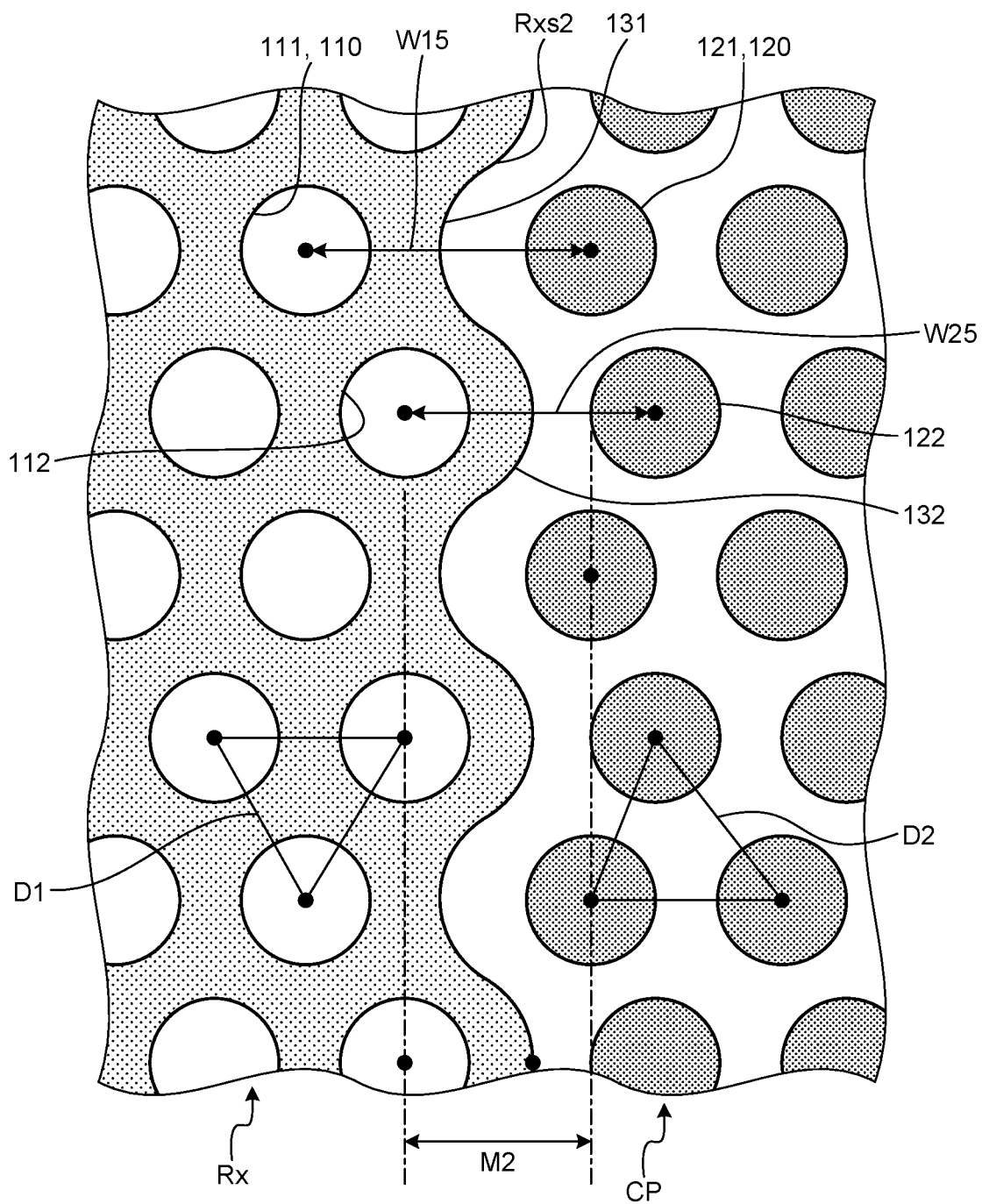
FIG. 8 is an enlarged view of a part around the end of the detection electrode according to a first modification.

FIG. 8 is an enlarged view of a part around the end of the detection electrode according to a first modification. The first modification changes the distance between the centers of the opening 111 and the dummy electrode 121 adjacent to the ends Rxs1 and Rxs2 of the detection electrode Rx in the first array PT1 from W13 to W15. The first modification also changes the distance between the centers of the opening 112 and the dummy electrode 122 adjacent to the ends Rxs1 and Rxs2 of the detection electrode Rx in the second array PT2 from W23 to L25. The openings 110 and the ends Rxs1 and Rxs2 are not changed.

More specifically, the dummy electrodes 121 belonging to the first arrays PT1 shift as a whole farther away from the recesses 131 than in the first embodiment while maintaining the distance W12 (refer to FIG. 6) between the centers of the dummy electrodes 121 adjacent to each other in the Y-direction. As a result, the distance between the centers of the opening 111 and the dummy electrode 121 is changed from W13 to L15, which is longer than the distance according to the first embodiment. The dummy electrodes 122 belonging to the second arrays PT2 shift as a whole closer to the protrusions 132 than in the first embodiment while maintaining the distance W22 (refer to FIG. 6) between the centers of the dummy electrodes 122 adjacent to each other in the Y-direction. As a result, the distance between the centers of the opening 112 and the dummy electrode 122 is changed from W23 to W25, which is shorter than the distance according to the first embodiment.

Consequently, the first modification can change the occupancy ratio of the conductive material in the non-detection region CP and the boundary M2 of the detection electrode Rx, although the virtual triangle D2 formed by connecting the centers of the dummy electrodes 120 is not an equilateral triangle.

Second Modification

Figure 9:
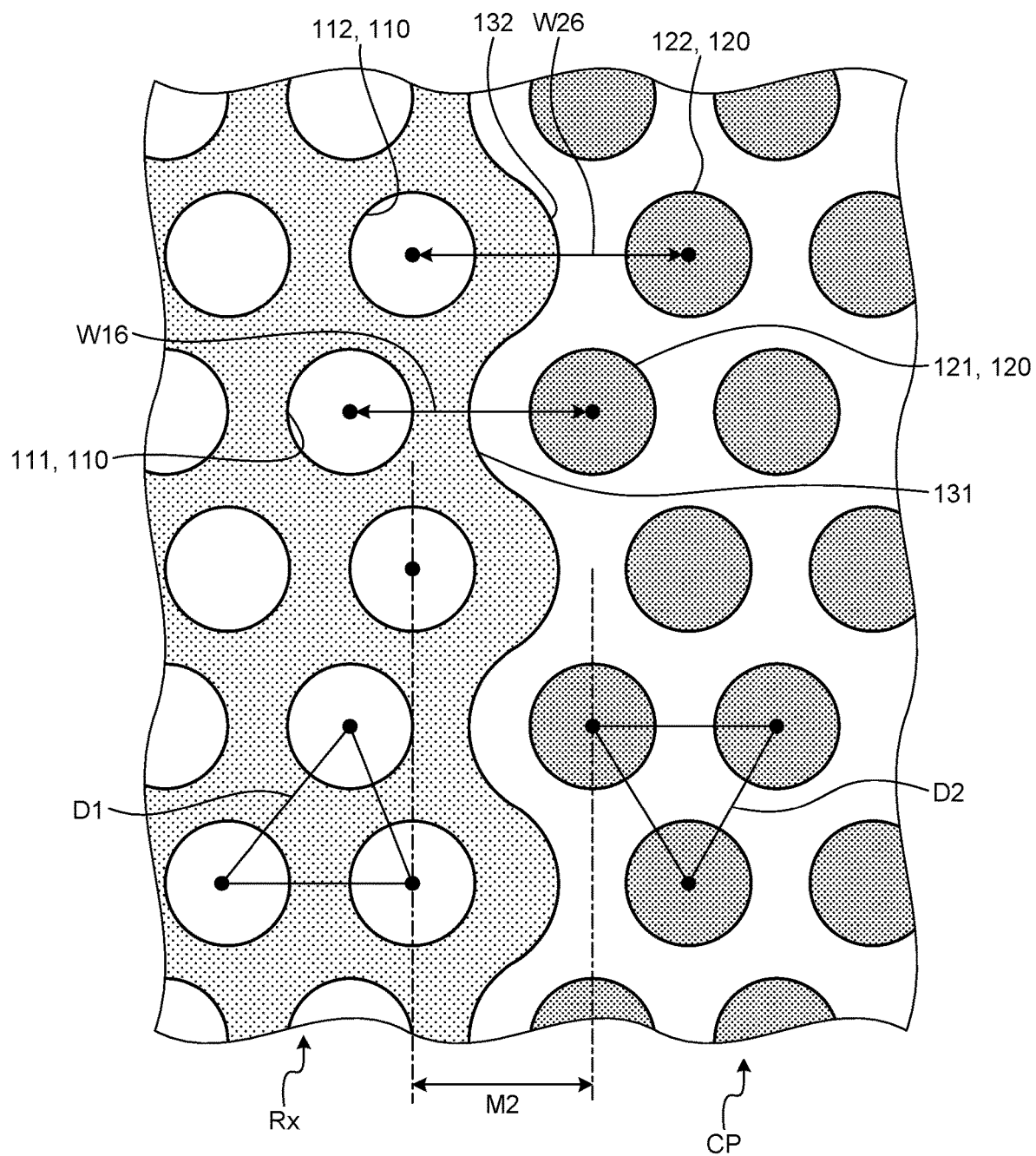
FIG. 9 is an enlarged view of a part around the end of the detection electrode according to a second modification.

FIG. 9 is an enlarged view of a part around the end of the detection electrode according to a second modification. The second modification changes the distance between the centers of the opening 111 and the dummy electrode 121 adjacent to the ends Rxs1 and Rxs2 of the detection electrode Rx in the first array PT1 from W13 to W16. The second modification also changes the distance between the centers of the opening 112 and the dummy electrode 122 adjacent to the ends Rxs1 and Rxs2 of the detection electrode Rx in the second array PT2 from W23 to W26. The dummy electrodes 120 and the ends Rxs1 and Rxs2 are not changed.

More specifically, the openings 111 belonging to the first arrays PT1 shift as a whole closer to the recesses 131 than in the first embodiment while maintaining the distance W11 (refer to FIG. 6) between the centers of the openings 111 adjacent to each other in the Y-direction. As a result, the distance between the centers of the opening 111 and the dummy electrode 121 is changed from W13 to W16, which is shorter than the distance according to the first embodiment. The openings 112 belonging to the second arrays PT2 shift as a whole farther away from the protrusions 132 than in the first embodiment while maintaining the distance W12 (refer to FIG. 6) between the centers of the openings 112 adjacent to each other in the Y-direction. As a result, the distance between the centers of the opening 112 and the dummy electrode 122 is changed from W23 to W26, which is shorter than the distance according to the first embodiment.

Consequently, the second modification can change the occupancy ratio of the conductive material in the detection electrode Rx and the boundary M2 of the detection electrode Rx, although the virtual triangle D1 formed by connecting the centers of the openings 110 is not an equilateral triangle.

Third Modification

Figure 10:
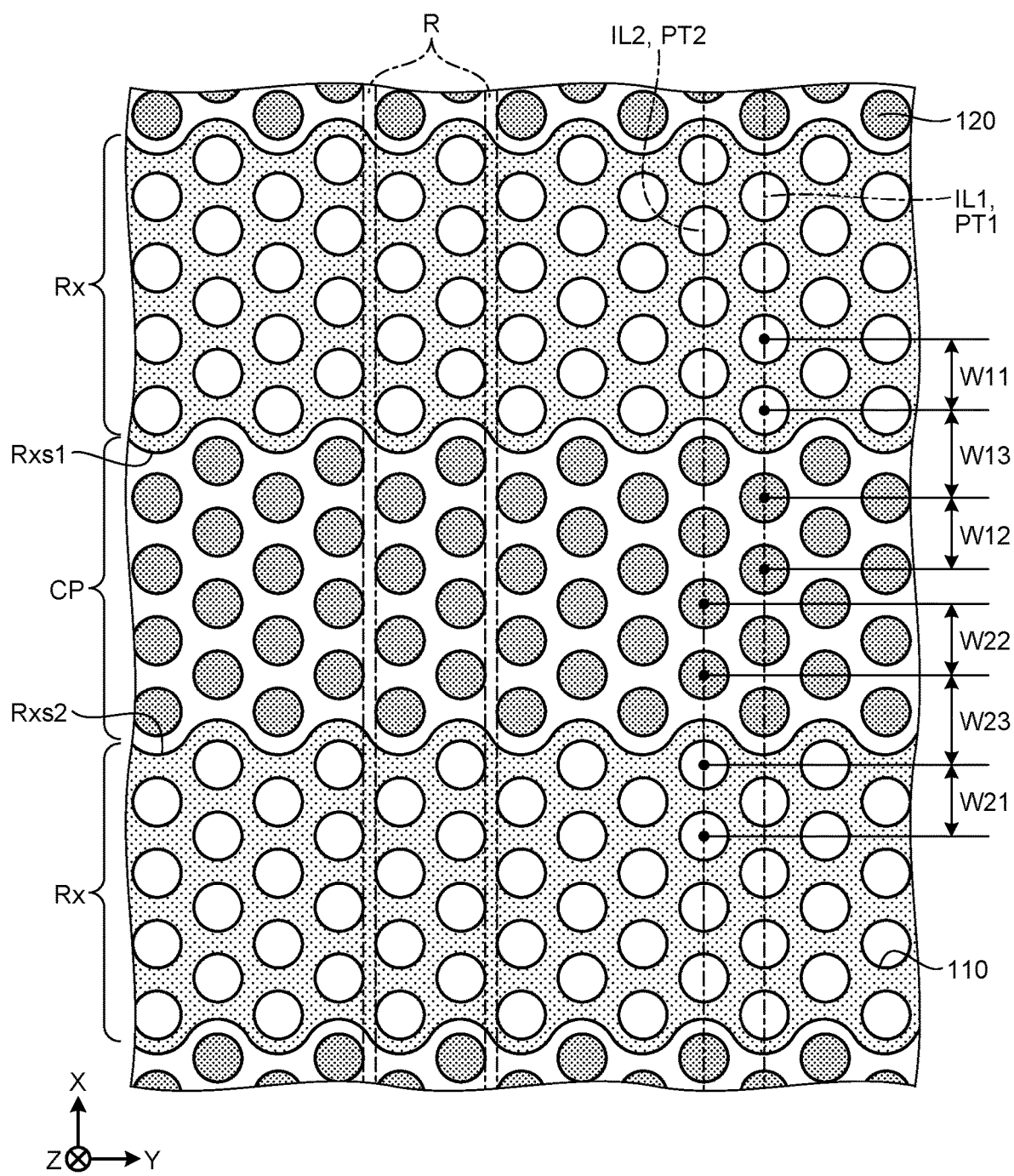
FIG. 10 is a schematic of the detection electrodes and the non-detection region according to a third modification in planar view.
Figure 11:
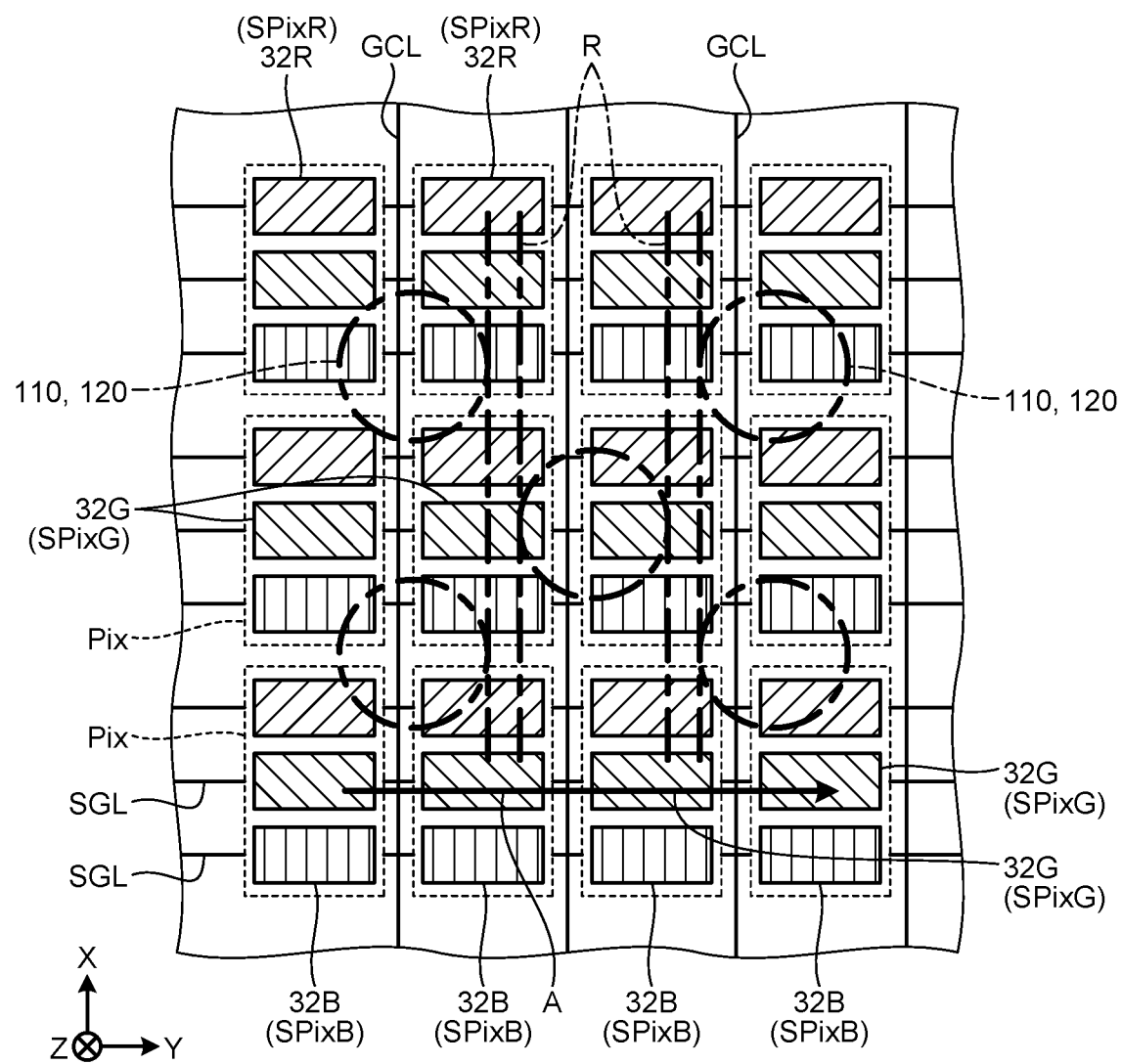
FIG. 11 is a schematic of the relation between the sub-pixels and the detection electrodes according to the third modification.

FIG. 10 is a schematic of the detection electrodes and the non-detection region according to a third modification in planar view. FIG. 11 is a schematic of the relation between the sub-pixels and the detection electrodes according to the third modification. As illustrated in FIG. 10, the third modification is different from the first embodiment in that the detection electrodes Rx extend not in the X-direction but in the Y-direction (first direction). In other words, the electrode extending direction (first direction) of the detection electrodes Rx according to the present embodiment is the Y-direction, and the second direction intersecting the first direction is the X-direction. As a result, the extending direction of the first array PT1 and the second array PT2 in which the openings 110 of the detection electrodes Rx and the dummy electrodes 120 are arrayed is changed to the X-direction (second direction). In addition, the extending direction of the continuous regions R provided with no opening 110 or no dummy electrode 120 is also changed to the X-direction (second direction). The lengths of W11, W12, W13, W21, W22, and W23 according to the third modification are equal to those according to the first embodiment. In other words, the lengths of W13 and W23 are longer than the lengths of W11, W12, W21, and W22.

As illustrated in FIG. 11, the third modification is different from the first embodiment in that the array direction of the sub-pixels SPixR, SPixG, and SPixB is the X-direction. In other words, the direction in which the color regions 32R, 32G, and 32B of the color filter 32 are arrayed is the X-direction. As a result, the same color array direction A of the sub-pixels SPix according to the third modification is the Y-direction. Therefore, the same color array direction A intersects the continuous regions R. This configuration can prevent the intensity of one color of the color regions 32R, 32G, and 32B from being lower than that of the other colors and suppress occurrence of moiré. In the third modification, the drive electrodes Tx and the scanning lines GCL extend in the X-direction, and the drive electrode driver 14 and the gate driver 12 are disposed in the peripheral region Gd in the X-direction of the substrate 21. The signal lines SGL extend in the Y-direction, and the source driver 13 is disposed in the peripheral region Gd in the Y-direction of the substrate 21.

Fourth Modification

Figure 12:
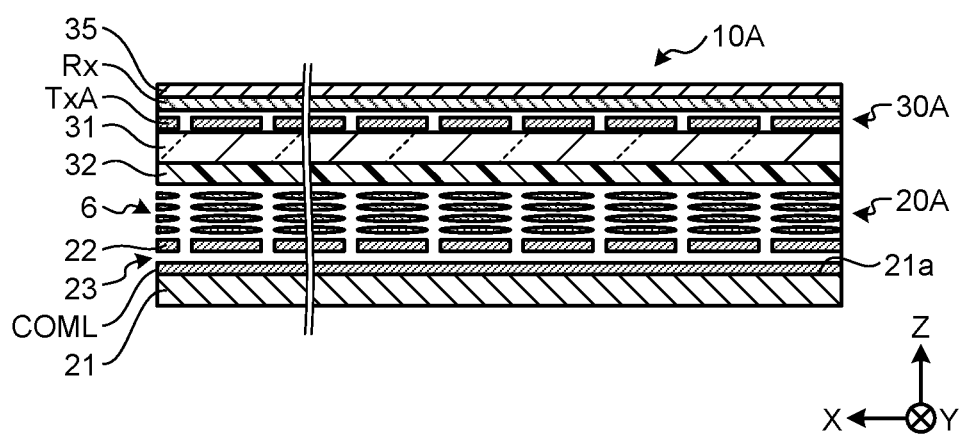
FIG. 12 is a sectional view of a schematic sectional structure of the display device according to a fourth modification.

FIG. 12 is a sectional view of a schematic sectional structure of the display device according to a fourth modification. As illustrated in FIG. 12, a panel portion 10A according to the fourth modification is what is called an on-cell device in which a detector 30A serving as a detecting device that detects a touch is mounted on a display portion 20A. In the on-cell device, the detector 30A may be provided directly on the display portion 20 or may be provided not directly on the display portion 20 but on it with another layer, such as the polarizing plate 35, interposed therebetween.

The display portion 20A is provided with common electrodes COML instead of the drive electrodes Tx. The detector 30A includes drive electrodes TxA provided on the upper surface of the substrate 31 and the detection electrodes Rx provided on the substrate 31 separately from the common electrodes COML of the display portion 20. The drive electrodes TxA are supplied with the detection drive signals VcomS. The drive electrodes TxA extend in the Y-direction. Therefore, the drive electrodes TxA and the detection electrodes Rx intersect with each other, thereby forming a mesh shape in planar view. An insulating layer is provided on the upper surface of the drive electrodes TxA.

In the fourth modification, the drive electrodes TxA supplied with the detection drive signals VcomS are provided separately from the drive electrodes COML supplied with the display drive signals VcomD. This configuration also prevents reflected light reflected by the ends Rxs1 and Rxs2 of the detection electrodes Rx from being linear light as described above. The mesh shape formed by the drive electrodes TxA and the detection electrodes Rx are hard to visually recognize. In addition, the occupancy ratio of the conductive material can be uniformized in all the regions including the detection electrodes Rx and the non-detection region CP. Consequently, the reflectance to incident light is equalized, and an image quality displayed on the display surface is improved.

Second Embodiment

Figure 13:
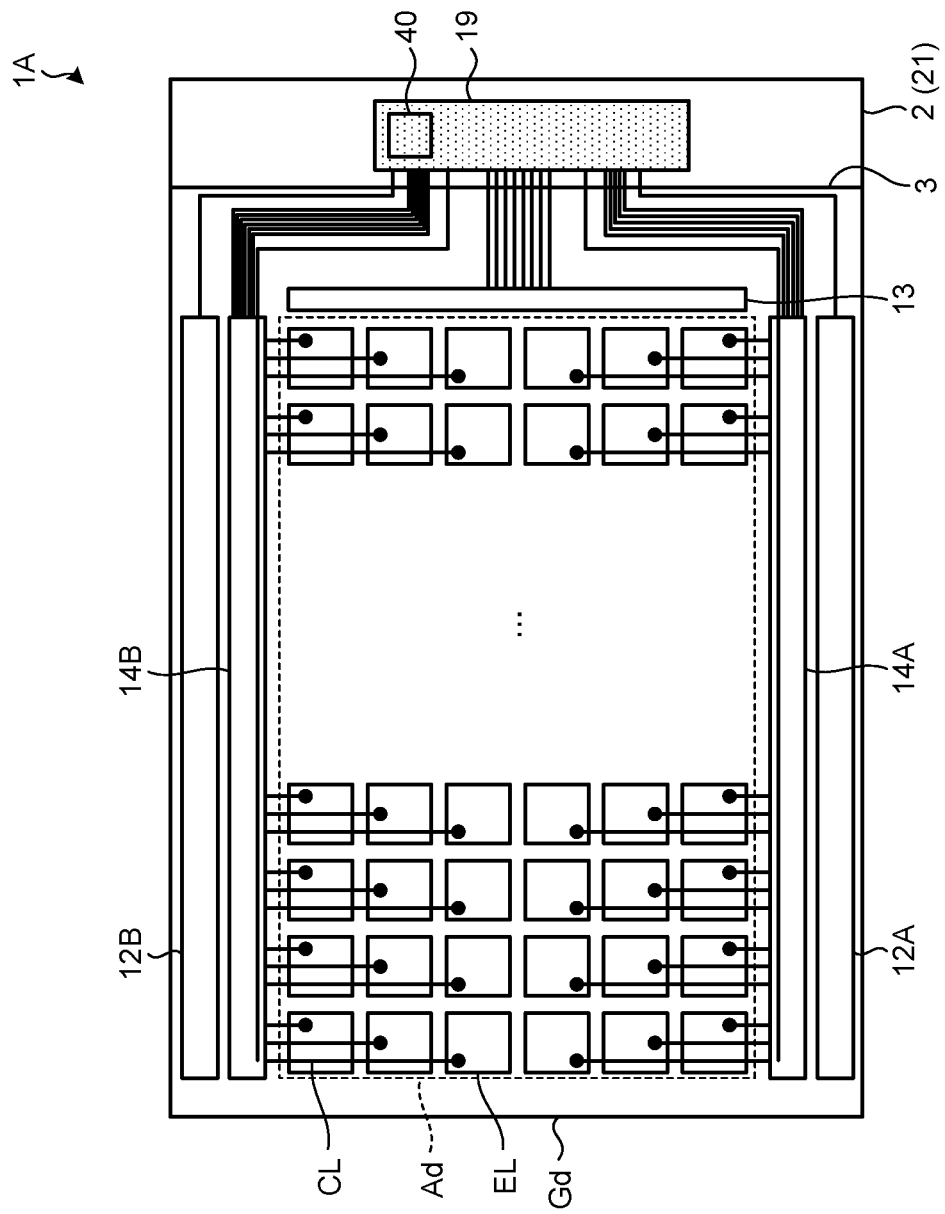
FIG. 13 is a diagram of an example of a self-capacitive display device.

FIG. 13 is a diagram of an example of the display device according to a second embodiment. The following describes a display device 1A according to the second embodiment. The display device according to the second embodiment employs a self-capacitance system. As illustrated in FIG. 13, the display device 1A according to the second embodiment includes electrodes EL provided in a matrix (row-column configuration). The electrode EL is used as an electrode that implements the functions of both the detection electrode Rx and the drive electrode Tx. Each electrode EL is coupled to the drive electrode scanner 14A or 14B and the detection circuit 40 via a coupling part, such as coupling wiring CL. The electrode EL may have a desired shape or size and may have a size corresponding to the size of the pixel, for example. The electrode EL according to the present embodiment may also serve as the common electrode COML constituting the display portion 20. The electrode EL is not limited thereto and may be disposed for each sub-pixel SPix of the display portion 20 to serve as the pixel electrode 22. In this case, the detection electrode Rx described above need not be provided. The electrodes EL may be disposed on the substrate 31 similarly to the detection electrodes Rx according to the first embodiment. In the display device 1A, the electrodes EL are coupled to the detection circuit 40 incorporated in the IC chip 19 disposed on the substrate 21. If the electrodes EL are provided on the substrate 31, they may be coupled to the detection circuit 40 incorporated in the detection driver IC formed on the wiring substrate P coupled to the substrate 21 similarly to the first embodiment.

Figure 14:
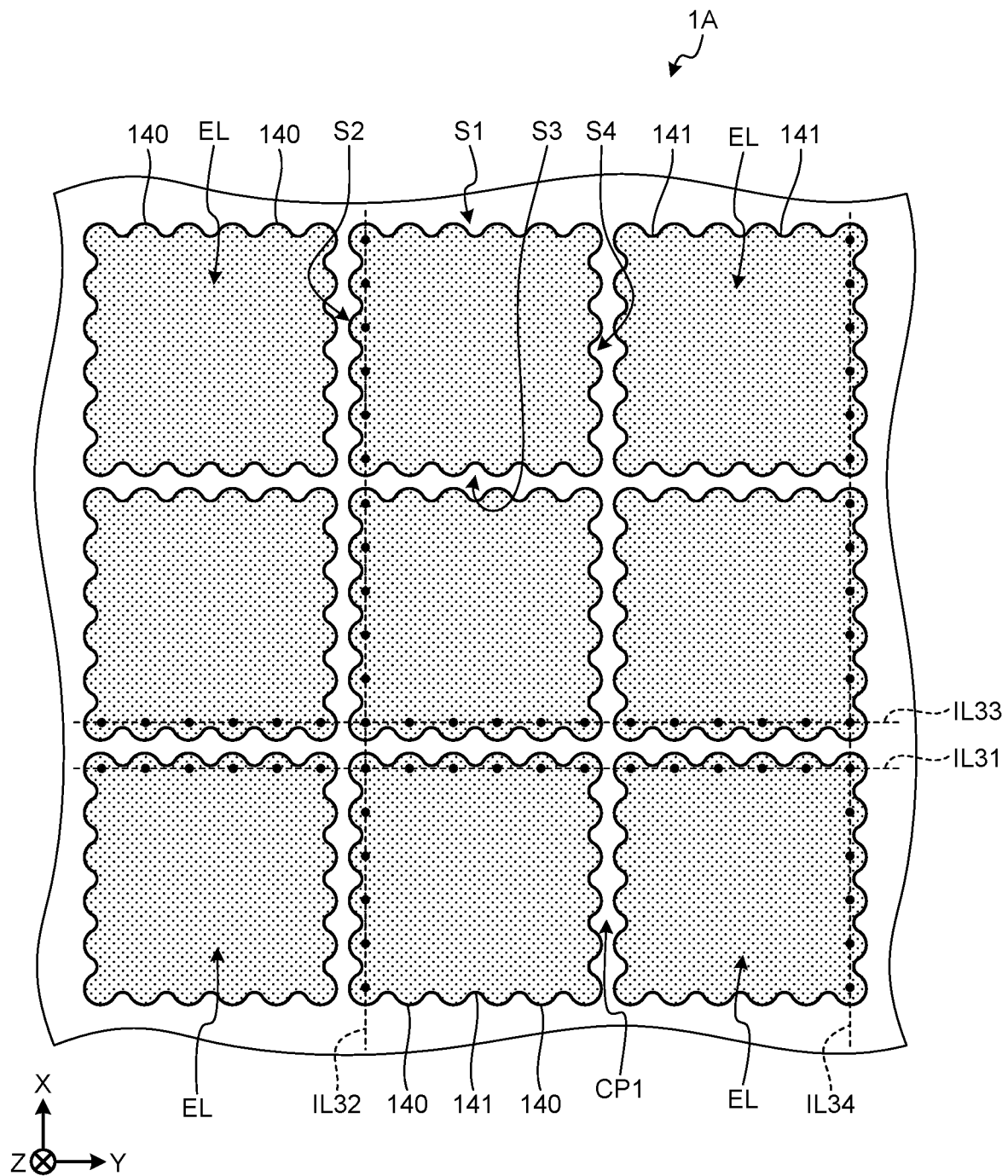
FIG. 14 is a plan view of some electrodes EL extracted from the display device according to a second embodiment in planar view.

FIG. 14 is a plan view of some electrodes extracted from the display device according to a second embodiment in planar view. The electrode EL has equal lengths in the X- and Y-directions and is formed into substantially a square in planar view. The electrodes EL are periodically arrayed in the X- and Y-directions. A non-detection region CP1 provided with no conductive material is formed between the electrodes EL adjacent to each other. The non-detection region CP1 linearly extends in the X- and Y-directions and is formed into a grid. The electrode EL has four ends S1 to S4. The ends S1 and S3 extend in the Y-direction, and the ends S2 and S4 extend in the X-direction. The detection electrode EL is surrounded by the ends S1, S2, S3, and S4. The ends S1, S2, S3, and S4 each have protrusions 140 and recesses 141. The protrusion 140 has a circular arc shape protruding toward the outside (outside the plane) of the electrode EL, and the recess 141 has a circular arc shape recessed toward the inside (inside the plane) of the electrode EL. The shape of the protrusion 140 and the recess 141 may be a polygon, an ellipse, or other shapes. Forming the protrusion 140 and the recess 141 in a circular shape suppresses a change in reflectance of external light if the relative angle between the user and the device is different.

Figure 15:
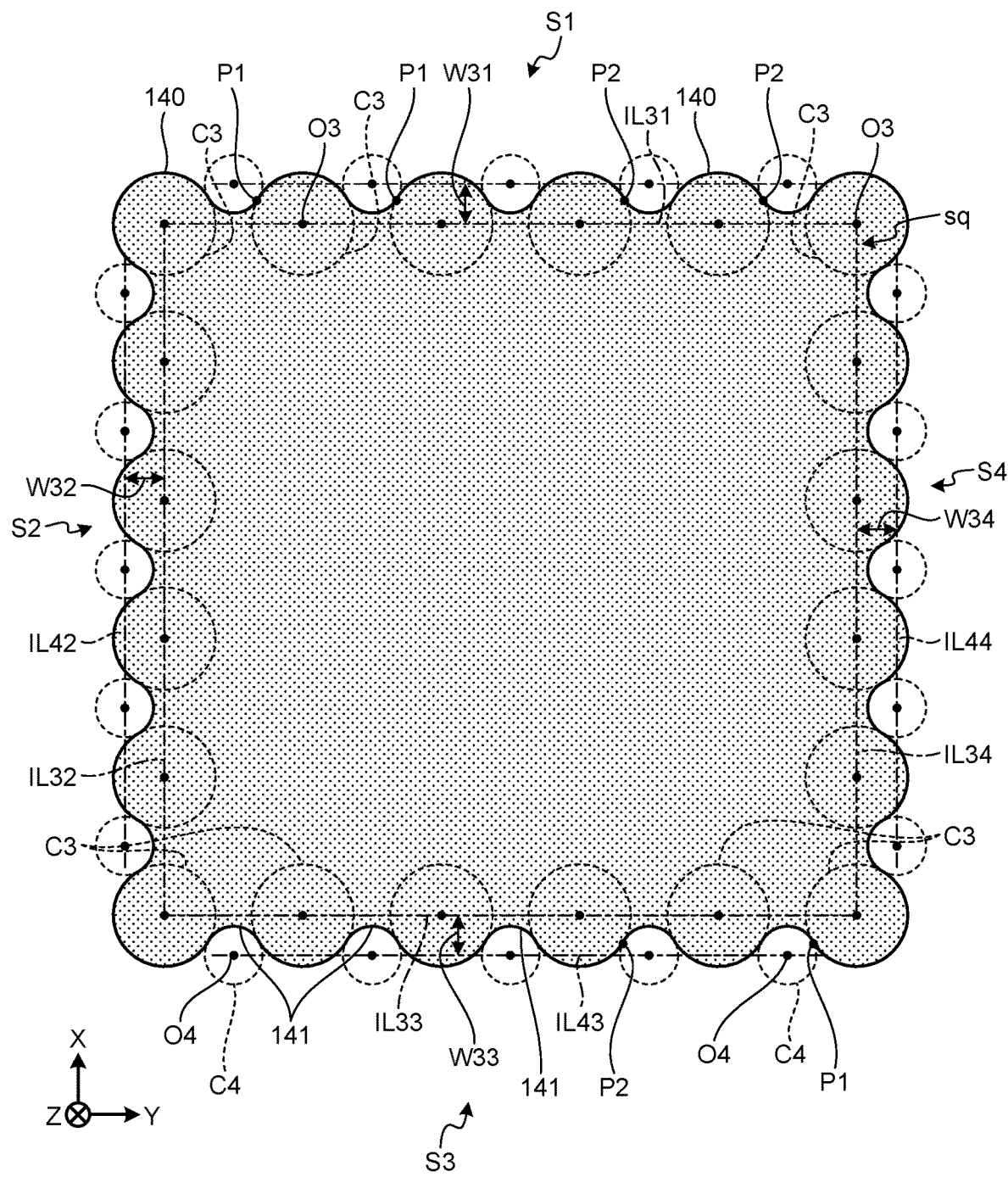
FIG. 15 is an enlarged view of part of FIG. 14.

FIG. 15 is an enlarged view of part of FIG. 14. The protrusion 140 of the electrode EL extends along a third virtual circle C3. The recess 141 of the electrode EL extends along a fourth virtual circle C4. The third virtual circle C3 has a larger diameter than the fourth virtual circle C4. The third virtual circles C3 and the fourth virtual circles C4 are arrayed with regularity. The following describes the regularity of the third virtual circles C3 and the fourth virtual circles C4.

The line segments connecting centers O3 of the third virtual circles C3 of the protrusions 140 constituting the ends S1 and S3 of the electrode EL are referred to as virtual lines IL31 and IL33, respectively. The virtual lines IL31 and IL33 extend in the Y-direction. The line segments connecting the centers O3 of the third virtual circles C3 of the protrusions 140 constituting the ends S2 and S4 of the electrode EL are referred to as virtual lines IL32 and IL34, respectively. The virtual lines IL32 and IL34 extend in the X-direction. The virtual lines IL31, IL32, IL33, and IL34 constitute a virtual quadrilateral sq. While the virtual quadrilateral sq according to the present embodiment is a square, it is not limited to thereto. The virtual quadrilateral sq may have a rectangular shape with longer ends S extending in one of the directions. The third virtual circles C3 are formed at equal intervals in the extending directions of the virtual lines IL31, IL32, IL33, and IL34. The third virtual circles C3 are also formed at the corners where the virtual lines IL32 and IL34 extending in the X-direction intersect the virtual lines IL31 and IL33 extending in the Y-direction with their centers O3 overlapping the respective corners.

The line segments connecting centers O4 of the fourth virtual circles C4 of the recesses 141 constituting the ends S1 and S3 of the electrode EL are referred to as virtual lines IL41 and IL43, respectively. The virtual lines IL41 and IL43 extend in the Y-direction. The line segments connecting the centers O4 of the fourth virtual circles C4 of the protrusions 142 constituting the ends S2 and S4 of the electrode EL are referred to as virtual lines IL42 and IL44, respectively. The virtual lines IL42 and IL44 extend in the X-direction. The fourth virtual circles C4 are formed at equal intervals in the extending directions of the virtual lines IL41, IL42, IL43 and IL44. The centers O4 of the fourth virtual circles C4 on the virtual lines IL41, IL42, IL43, and IL44 are each positioned between the third virtual circles C3 in the extending direction of the virtual lines IL41, IL42, IL43, and IL44. The distance between the virtual lines IL31 and IL41 in the X-direction is a width W31. The distance between the virtual lines IL32 and IL42 in the Y-direction is a width W32. The distance between the virtual lines IL33 and IL43 in the X-direction is a width W33. The distance between the virtual lines IL34 and IL44 in the Y-direction is a width W34. The widths W31, W32, W33, and W34 are substantially equal. The widths W31, W32, W33, and W34 have such a length that allows the fourth virtual circle C4 to be tangent to the third virtual circles C3 formed on both sides. In other words, the widths W31, W32, W33, and W34 each have a length smaller than the total of the radius of the third virtual circle C3 and the radius of the fourth virtual circle C4. The third virtual circle C3 and the fourth virtual circle C4 have points of tangency P3 and P4.

In the third virtual circle C3 and the fourth virtual circle C4 described above, the protrusion 140 is formed into a circular arc extending on the third virtual circle C3 and protruding toward the outside of the electrode EL. By contrast, the recess 141 is formed into a circular arc extending on the fourth virtual circle C4 and recessed toward the inside of the electrode EL. The protrusion 140 and the recess 141 extend to the points of tangency P3 and P4 on the third virtual circle C3 and the fourth virtual circle C4. The end of the protrusion 140 and the end of the recess 141 are coupled on the points of tangency P3 and P4.

As illustrated in FIG. 14, the electrodes EL have the same shape. In the X-direction, each electrode EL is disposed such that the virtual lines IL31 and IL33 of the electrode EL are positioned along the extending direction of the virtual lines IL31 and IL33 of the electrodes EL adjacent to the electrode EL in the Y-direction. In other words, the electrodes EL are disposed with their virtual lines IL31 and IL33 aligned in the Y-direction. In the Y-direction, each electrode EL is disposed such that the virtual lines IL32 and IL34 of the electrode EL are positioned along the extending direction of the virtual lines IL32 and IL34 of the electrodes EL adjacent to the electrode EL in the X-direction. In other words, the electrodes EL are disposed with their virtual lines IL32 and IL34 aligned in the X-direction. Thus, the electrodes EL are arrayed in a matrix (row-column configuration). The protrusions 140 face each other across the non-detection region CP1 between the electrodes EL. Similarly, the recesses 141 face each other across the non-detection region CP1.

As described above, the ends S1, S2, S3, and S4 of the electrode EL according to the second embodiment have the protrusions 140 and the recesses 141 formed alternately and have a wave shape that alternately rises and falls. In other words, the ends S1, S2, S3, and S4 of the electrode EL have no straight line part extending linearly. Consequently, the second embodiment prevents linear light reflected by the ends S1, S2, S3, and S4 of the electrodes EL from being visually recognized and makes the boundary between the electrodes EL and the non-conductive material region CP1 hard to see.

Fifth Modification

Figure 16:
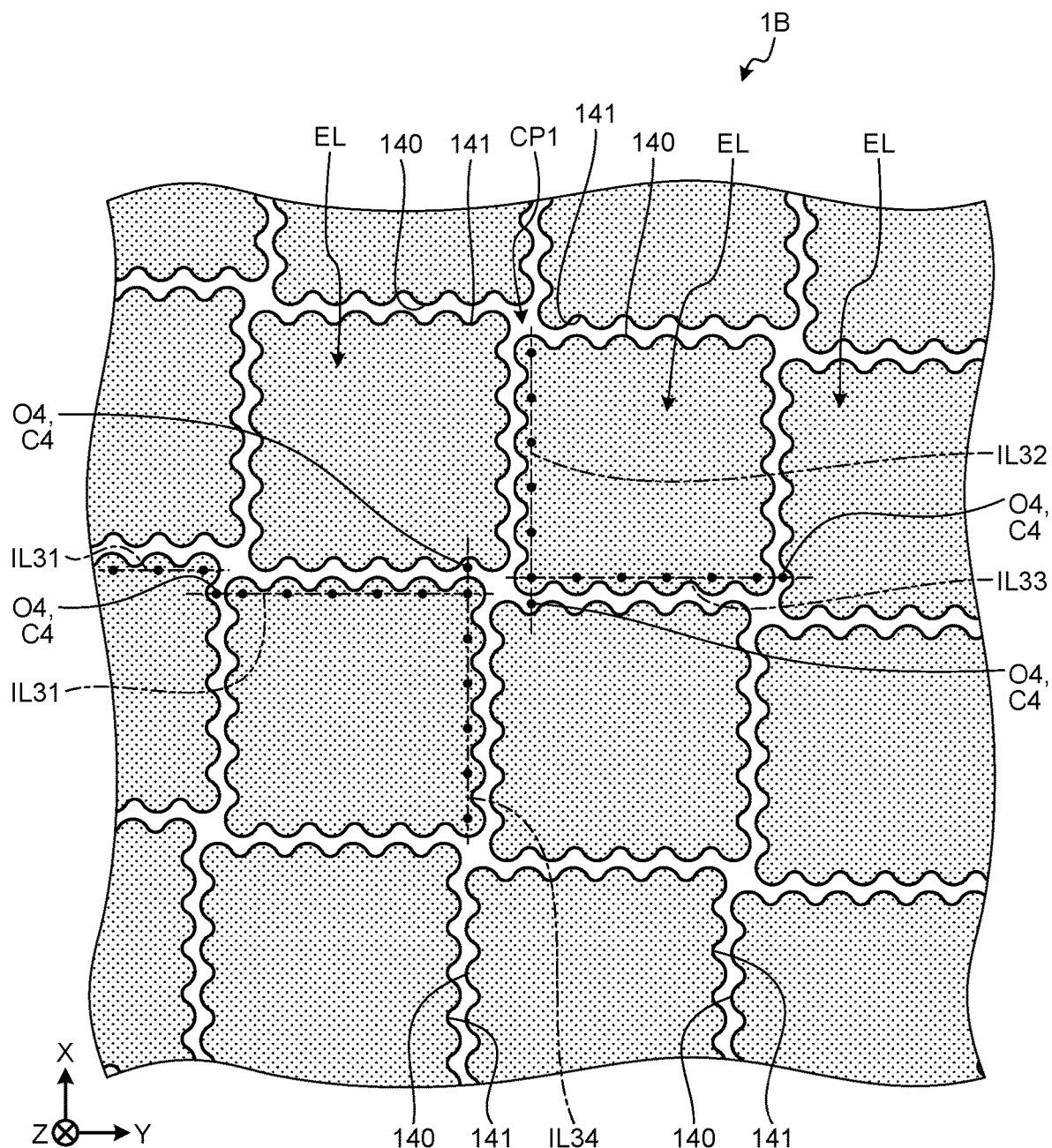
FIG. 16 is a plan view of some electrodes extracted from the display device according to a fifth modification in planar view.

FIG. 16 is a plan view of some electrodes extracted from the display device according to a fifth modification in planar view. A display device 1B according to the fifth modification is different from the display device according to the second embodiment in that the electrodes EL are not arrayed in a matrix (row-column configuration) and that each electrode EL is shifted in the X- and Y-directions with respect to the adjacent electrodes EL. More specifically, the virtual line IL31 of each electrode EL is shifted in the X-direction with respect to the virtual lines IL31 of the electrodes EL adjacent to the electrode EL in the Y-direction. The centers O4 of the recesses 141 (fourth virtual circles C4) of the electrodes EL adjacent to the electrode EL in the Y-direction overlap the extensions of the virtual lines IL31 and IL33 of the electrode EL. The centers O4 of the recesses 141 (fourth virtual circles C4) of the electrodes EL adjacent to the electrode EL in the X-direction overlap the extensions of the virtual lines IL32 and IL34 of the electrode EL. Therefore, the protrusions 140 of the electrode EL face the recesses 141 of the adjacent electrodes EL across the non-detection region CP1. In addition, the protrusions 140 of the electrode EL are close to the recesses 141 facing them. In other words, the electrodes EL are disposed closer to each other than in the second embodiment. Consequently, the display device 1B according to the second modification can reduce the area of the non-detection region CP1 formed between the electrodes EL and include more electrodes EL.

Sixth Modification

Figure 17:
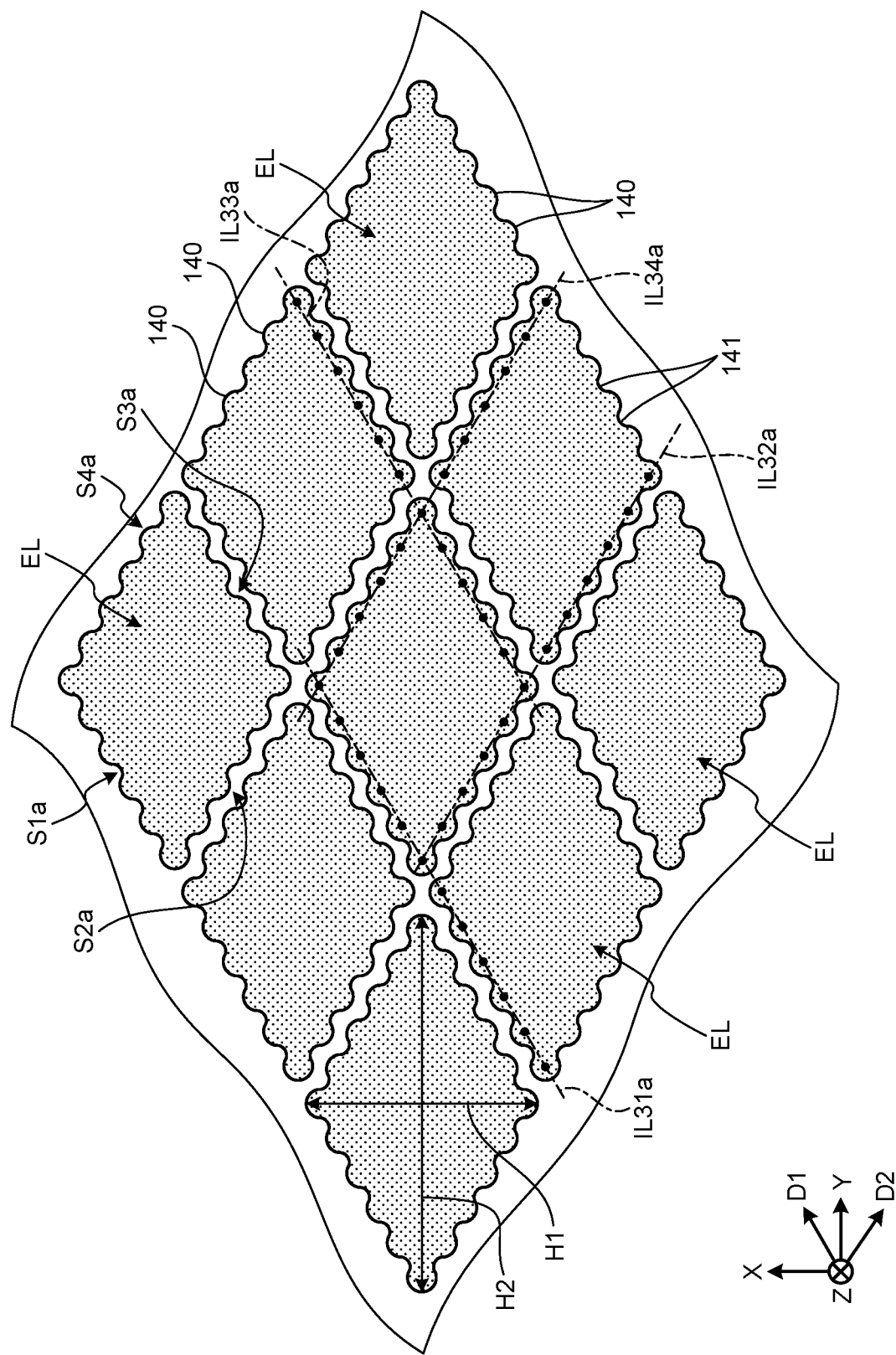
FIG. 17 is a plan view of some electrodes extracted from the display device according to a sixth modification in planar view.
Figure 18:
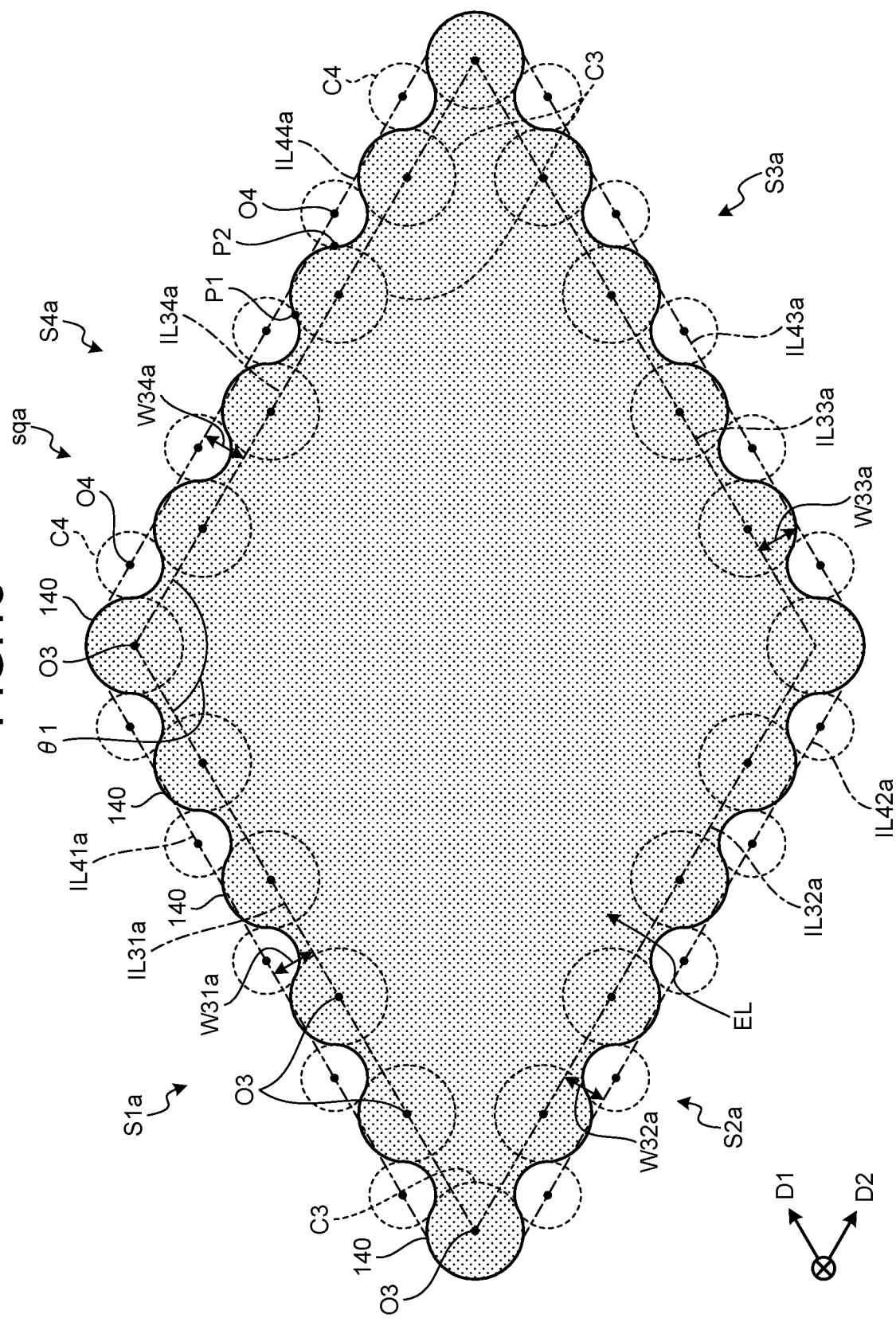
FIG. 18 is an enlarged view of part of FIG. 17.

FIG. 17 is a plan view of some electrodes EL extracted from the display device according to a sixth modification in planar view. FIG. 18 is an enlarged view of part of FIG. 17. The display device according to the sixth modification is different from the display device according to the second embodiment in the shape and the array direction of the electrodes EL.

The electrode EL has four ends S1, S2, S3, and S4. The electrode EL is formed into a rhombic shape with a first diagonal H1 extending in the X-direction and a second diagonal extending in the Y-direction. In other words, the ends S1$a$ and S3$a$ each extend in a D1 direction at a first angle with respect to the X-direction, and the ends S2$a$ and S4$a$ each extend in a D2 direction at a second angle with respect to the X-direction. An angle θ1 (refer to FIG. 18) at which the ends S1$a$ and S4$a$ intersect is an angle other than 90 degrees, and specifically is 120 degrees in the modification. The electrodes EL are arrayed such that the end S1$a$ faces the end S3$a$ and that the end S2$a$ faces the end S4$a$ across the non-detection region CP1. The ends S1$a$, S2$a$, S3$a$, and S4$a$ each have the protrusions 140 and the recesses 141. The protrusion 140 has a circular arc shape protruding toward the outside of the electrode. The recess 141 has a circular arc shape protruding toward the inside of the electrode.

As illustrated in FIG. 18, the protrusion 140 extends along the third virtual circle C3. The recess 141 extends along the fourth virtual circle C4. The line segments connecting the centers O3 of the third virtual circles C3 of the protrusions 140 constituting the ends S1$a$ and S3$a$ of the electrode EL are referred to as virtual lines IL31$a$ and IL33$a$, respectively. The virtual lines IL31$a$ and IL33$a$ extend in the D1 direction. The line segments connecting the centers O3 of the third virtual circles C3 of the protrusions 140 constituting the ends S2a and S4a of the electrode EL are referred to as virtual lines IL32a and IL34a, respectively. The virtual lines IL32a and IL34a extend in the D2 direction. The virtual lines IL31a, IL32a, IL33a, and IL34a constitute a virtual quadrilateral sqa. The virtual quadrilateral sqa is a rhombus. The third virtual circles C3 are formed at equal intervals on the virtual lines IL31a, IL32a, IL33a, and IL34a. The third virtual circles C3 are also formed at the corners where the virtual lines IL32a and IL34a extending in the D1 direction intersect the virtual lines IL31a and IL33a extending in the D2 direction with their centers O3 overlapping the respective corners.

The line segments connecting the centers O4 of the fourth virtual circles C4 of the recesses 141 constituting the ends S1a and S3a of the electrode EL are referred to as virtual lines IL41a and IL43a, respectively. The virtual lines IL41a and IL43a extend in the D1 direction. The line segments connecting the centers O4 of the fourth virtual circles C4 of the recesses 141 constituting the ends S2a and S4a of the electrode EL are referred to as virtual lines IL42a and IL44a, respectively. The virtual lines IL42a and IL44a extend in the D2 direction. The fourth virtual circles C4 are formed at equal intervals in the extending directions of the virtual lines IL41a, IL42a, IL43a and IL44a. The centers O4 of the fourth virtual circles C4 on the virtual lines IL41a, IL42a, IL43a, and IL44a are each positioned between the third virtual circles C3 in the extending direction of the virtual lines IL41a, IL42a, IL43a, and Il44a. In addition, the fourth virtual circle C4 is tangent to both the third virtual circles C3 and has the points of tangency P3 and P4.

The distance between the virtual lines IL31a and IL41a in the X-direction is W31a. The distance between the virtual lines IL32a and IL42a in the Y-direction is W32a. The distance between the virtual lines IL33a and IL43a in the X-direction is W33a. The distance between the virtual lines IL34a and IL44a in the Y-direction is W34a. The distances W31a, W32a, W33a, and W34a are substantially equal.

The protrusion 140 is formed into a circular arc extending on the third virtual circle C3 and protruding toward the outside of the electrode EL. By contrast, the recess 141 is formed into a circular arc extending on the fourth virtual circle C4 and recessed toward the inside of the electrode EL. The protrusion 140 and the recess 141 extend to the points of tangency P3 and P4 on the third virtual circle C3 and the fourth virtual circle C4. Therefore, the end of the protrusion 140 and the end of the recess 141 are coupled on the points of tangency P3 and P4.

As illustrated in FIG. 17, in the X-direction, each electrode EL is disposed such that the virtual lines IL31 and IL33 of the electrode EL are positioned along the extending direction of the virtual lines IL31 and IL33 of the electrodes EL adjacent to the electrode EL in the D1 direction. In other words, the electrodes EL are disposed with their virtual lines IL31 and IL33 aligned in the Y-direction. In the Y-direction, each electrode EL is disposed such that the virtual lines IL32 and IL34 of the electrode EL are positioned along the extending direction of the virtual lines IL32 and IL34 of the electrodes EL adjacent to the electrode EL in the D2 direction. In other words, the electrodes EL are disposed with their virtual lines IL32 and IL34 aligned in the X-direction. Thus, the electrodes EL are arrayed in a matrix (row-column configuration) in the D1 and D2 directions.

As described above, the ends S1a, S2a, S3a, and S4a of the electrode EL have the protrusions 140 and the recesses 141 formed alternately and have a wave shape that alternately rises and falls. Consequently, the sixth modification prevents linear light reflected by the ends S1a, S2a, S3a, and S4a of the electrodes EL from being visually recognized and makes the boundary between the electrodes EL and the non-conductive material region CP1 hard to see.

Figure 19:
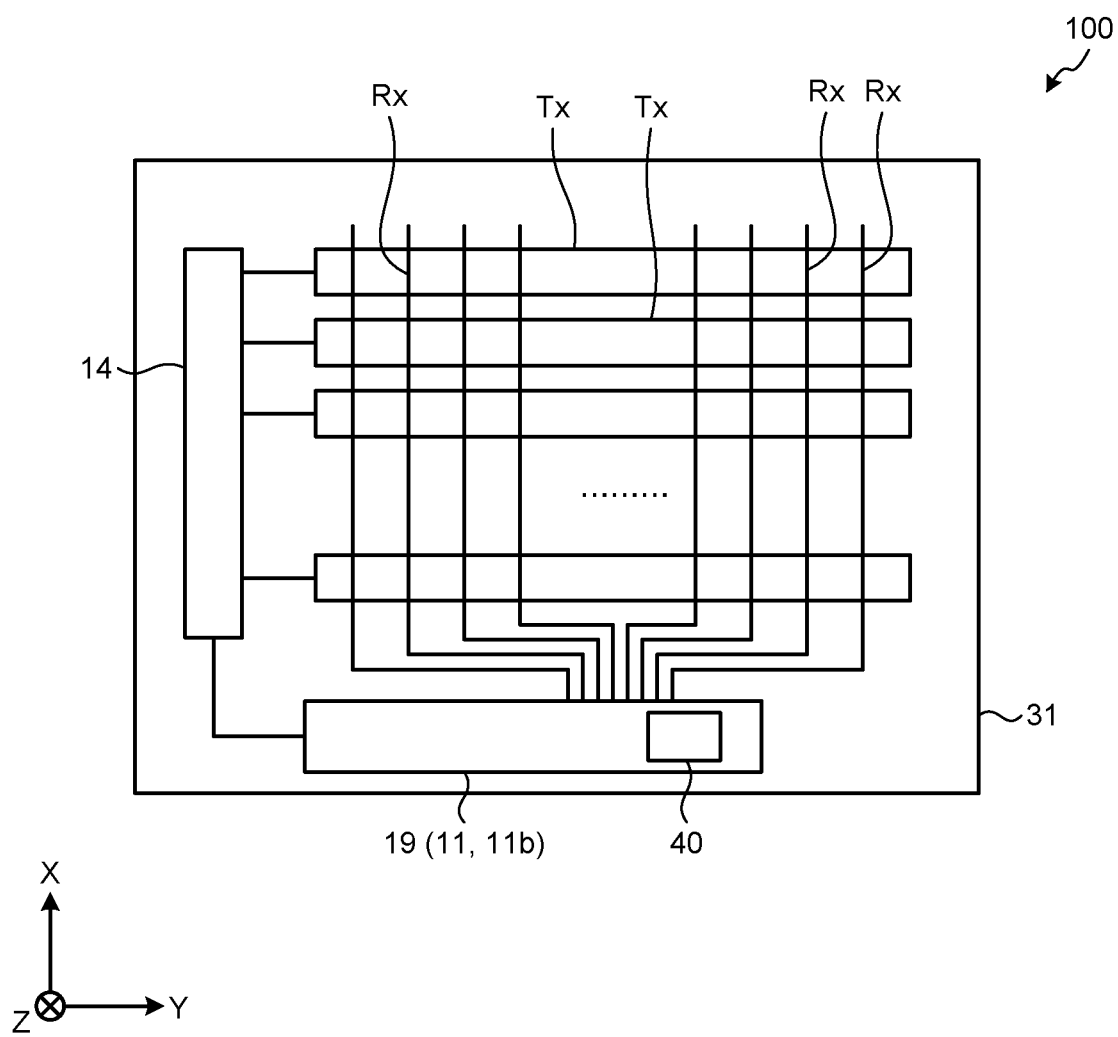
FIG. 19 is a diagram of an example of a main configuration of a detecting device.

FIG. 19 is a diagram of an example of the configuration of a detecting device. While the embodiments and the modifications above have described the examples of the display device including the display portion, the present disclosure may be a detecting device 100 not including the display portion 20. As illustrated in FIG. 19, the detecting device 100 includes the drive electrodes Tx and the detection electrodes Rx on the substrate 31, for example. The detecting device 100 includes the IC chip 19, the drive electrode driver 14, and the detection circuit 40. The IC chip 19 functions as the control circuit 11 (detection control circuit 11b). The drive electrode driver 14 supplies the drive signals VcomS to the drive electrodes Tx. The detection circuit 40 receives the detection signals output from the detection electrodes Rx.

What is claimed is:

1. A detecting device comprising:
a plurality of detection electrodes extending in a first direction along a substrate and disposed apart from each other in a second direction orthogonal to the first direction; and
a plurality of dummy electrodes provided between the detection electrodes, wherein
the detection electrodes each have a plurality of openings,
a plurality of arrays are formed in which the dummy electrodes and the openings of the detection electrodes are periodically arrayed in the second direction,
the arrays include a first array and a second array adjacent to the first array in the first direction, the first array and the second array being alternately arrayed,
each of the openings of the detection electrode belonging to the first array is formed in:
a first triangular grid with two of the openings of the detection electrode belonging to the second array; or
a second triangular grid with one of the openings of the detection electrode and one of the dummy electrodes belonging to the second array,
each of the dummy electrodes belonging to the first array is disposed in:
a third triangular grid with two of the dummy electrodes belonging to the second array; or
a fourth triangular grid with one of the dummy electrodes and one of the openings of the detection electrode belonging to the second array,
an end of the detection electrode in the second direction has:
a plurality of recesses each formed into a circular arc shape along a first virtual circle and recessed toward inside of the detection electrode; and
a plurality of protrusions each formed into a circular arc shape along a second virtual circle and protruding toward outside of the detection electrode, the recesses and the protrusions being alternately and continuously formed in the first direction,
a dummy electrode distance is a distance between centers of the dummy electrodes adjacent to each other in the second direction,
an opening distance is a distance between centers of the openings of the detection electrodes adjacent to each other in the second direction, and
at least one of the dummy electrode distance and the opening distance is less than a distance between a center of one of the dummy electrodes and a center of one of the openings of the detection electrodes, the one of the dummy electrodes being adjacent to the one of the openings, in the second direction.

2. The detecting device according to claim 1, wherein
the center of the first virtual circle is positioned on a first virtual line passing through the centers of the dummy electrodes and the openings of the detection electrodes belonging to the first array, and
the center of the second virtual circle is positioned on a second virtual line passing through the centers of the dummy electrodes and the openings of the detection electrodes belonging to the second array.

3. The detecting device according to claim 1, wherein the radius of the recess is equal to the radius of the opening.

4. The detecting device according to claim 1, wherein the center of the protrusion coincides with the center of the opening formed at the end of the detection electrode.

5. The detecting device according to claim 1, wherein a distance between the centers of the opening and the dummy electrode disposed adjacent to the recess is equal to a distance between the centers of the opening and the dummy electrode disposed adjacent to the protrusion.

6. The detecting device according to claim 1, wherein a distance between the centers of the opening and the dummy electrode disposed adjacent to the recess is different from a distance between the centers of the opening and the dummy electrode disposed adjacent to the protrusion.

7. A display device comprising:
the detecting device according to claim 1;
a display substrate; and
a color filter provided on a display surface of the display substrate, wherein
the color filter includes a first color filter provided in a first sub-pixel region, a second color filter provided in a second sub-pixel region, and a third color filter provided in a third sub-pixel region, the first color filter, the second color filter, and the third color filter being arrayed in order from one side to the other in the second direction, and
the first color filter, the second color filter, and the third color filter are each disposed with the color filter in the same color being adjacent thereto in the first direction.

8. The detecting device according to claim 1, wherein a center of the first virtual circle adjacent to one of the protrusions is disposed at an inner position of the detection electrodes relative to an apex of the one of the protrusions, in the second direction.

9. The detecting device according to claim 1, wherein shapes of the second triangular grid and the fourth triangular grid are not an equilateral triangle and not an isosceles triangle.

10. A detecting device comprising:
a plurality of electrodes having a plane parallel to a substrate; and
a plurality of dummy electrodes provided between the electrodes, wherein
the electrodes each have a rectangular shape surrounded by a plurality of ends,
each of the ends of the electrodes has:
a protrusion having a circular arc shape protruding from inside toward outside of the plane; and
a recess having a circular arc shape recessed from outside toward inside of the plane, and
the protrusion and the recess are formed alternately and continuously along each of the ends of the electrodes,
the electrodes each have a plurality of openings,
a plurality of arrays are formed in which the dummy electrodes and the openings of the electrodes are periodically arrayed in the second direction,
the arrays include a first array and a second array adjacent to the first array in the first direction, the first array and the second array being alternately arrayed,
each of the openings of the electrode belonging to the first array is formed in:
a first triangular grid with two of the openings of the electrode belonging to the second array; or
a second triangular grid with one of the openings of the electrode and one of the dummy electrodes belonging to the second array,
each of the dummy electrodes belonging to the first array is disposed in:
a third triangular grid with two of the dummy electrodes belonging to the second array; or
a fourth triangular grid with one of the dummy electrodes and one of the openings of the electrode belonging to the second array,
an end of the electrode in the second direction has:
a plurality of recesses each formed into a circular arc shape along a first virtual circle and recessed toward inside of the electrode; and
a plurality of protrusions each formed into a circular arc shape along a second virtual circle and protruding toward outside of the electrode, the recesses and the protrusions being alternately and continuously formed in the first direction,
a dummy electrode distance is a distance between centers of the dummy electrodes adjacent to each other in the second direction,
an opening distance is a distance between centers of the openings of the electrodes adjacent to each other in the second direction, and
at least one of the dummy electrode distance and the opening distance is less than a distance between a center of one of the dummy electrodes and a center of one of the openings of the electrodes, the one of the dummy electrodes being adjacent to the one of the openings, in the second direction.

11. A display device comprising:
the detecting device according to claim 10; and
a display portion.

* * * * *